(12) United States Patent
Peaker et al.

(10) Patent No.: US 11,510,830 B2
(45) Date of Patent: Nov. 29, 2022

(54) HOIST MECHANISM

(71) Applicant: Autochair Limited, Alfreton (GB)

(72) Inventors: Martin Peaker, Alfreton (GB); Tom Cresswell, Alfreton (GB); Pawel Cichy, Alfreton (GB)

(73) Assignee: Autochair Limited, Alfreton (GB)

( * ) Notice: Subject to any disclaimer, the term of this patent is extended or adjusted under 35 U.S.C. 154(b) by 30 days.

(21) Appl. No.: 17/191,880

(22) Filed: Mar. 4, 2021

(65) Prior Publication Data

US 2021/0275367 A1 Sep. 9, 2021

(30) Foreign Application Priority Data

Mar. 4, 2020 (GB) ..................................... 2003138

(51) Int. Cl.
*A61G 3/06* (2006.01)
*B60P 1/54* (2006.01)
*B66C 23/44* (2006.01)
*B66D 1/34* (2006.01)

(52) U.S. Cl.
CPC ............ *A61G 3/062* (2013.01); *B60P 1/5404* (2013.01); *B60P 1/5433* (2013.01); *B60P 1/5485* (2013.01); *B66C 23/44* (2013.01); *B66D 1/34* (2013.01); *B60P 1/549* (2013.01); *B66D 2700/0183* (2013.01)

(58) Field of Classification Search
CPC ...... A61G 3/062; B60P 1/5404; B60P 1/5433; B60P 1/5485; B60P 1/5495; B66C 23/44; B66D 1/34; B66D 2700/0183

USPC ......................................... 254/323, 325, 327
See application file for complete search history.

(56) References Cited

U.S. PATENT DOCUMENTS

| 3,784,035 | A |   | 1/1974  | Dunbar        |            |
|-----------|---|---|---------|---------------|------------|
| 3,804,263 | A |   | 4/1974  | Castonguay    |            |
| 3,948,488 | A | * | 4/1976  | Brockelsby    | B66D 1/72  |
|           |   |   |         |               | 254/323    |
| 3,957,164 | A |   | 5/1976  | Brown         |            |
| 3,999,228 | A |   | 12/1976 | Thomas        |            |
| 4,226,331 | A |   | 10/1980 | Dumond        |            |
| 4,272,218 | A |   | 6/1981  | Carter        |            |
| 4,296,509 | A |   | 10/1981 | Simmons et al.|            |
| 4,523,684 | A |   | 6/1985  | Baisden       |            |

(Continued)

FOREIGN PATENT DOCUMENTS

EP      1727765 B1     5/2012
EP      2578197 A1     4/2013

(Continued)

*Primary Examiner* — James Keenan
(74) *Attorney, Agent, or Firm* — Young Basile Hanlon & MacFarlane, P.C.

(57) ABSTRACT

A hoist mechanism for lifting articles, such as a mobility scooter, into and from an interior of an automobile has a boom arranged to be mounted on the vehicle. A length of webbing depends from the boom and can be attached to the article to be lifted in use. An electric motor is configured to retract the webbing to provide lifting of the article by winding the webbing onto a spool. The boom has a mounting bracket. The spool is mounted to one side of the mounting bracket and the electric motor is mounted on the other side of the mounting bracket. The boom may take the form of a pivoting and swiveling armature. The boom may be releasably latched in a raised condition for use.

20 Claims, 14 Drawing Sheets

(56) References Cited

U.S. PATENT DOCUMENTS

| | | | |
|---|---|---|---|
| 4,596,336 A | 6/1986 | Zwagerman | |
| 4,736,929 A * | 4/1988 | McMorris | B66D 1/22 |
| | | | 254/323 |
| 4,881,864 A | 11/1989 | Amato | |
| 5,064,078 A | 11/1991 | Van Staveren | |
| 5,072,840 A | 12/1991 | Asakawa et al. | |
| 5,090,580 A * | 2/1992 | Nelson | B66C 23/44 |
| | | | 414/462 |
| 5,337,908 A | 8/1994 | Beck, Jr. | |
| 5,379,468 A | 1/1995 | Cassidy et al. | |
| 5,431,526 A * | 7/1995 | Peterson | B66C 23/44 |
| | | | 212/231 |
| 5,445,281 A | 8/1995 | Hung | |
| 5,494,117 A | 2/1996 | Aldridge | |
| 5,522,582 A * | 6/1996 | Dilks | B66D 1/40 |
| | | | 254/323 |
| 5,730,304 A | 3/1998 | Duncan | |
| 5,788,095 A | 8/1998 | Watson | |
| 5,853,282 A * | 12/1998 | Bechler | B60P 1/548 |
| | | | 414/543 |
| 6,006,377 A | 12/1999 | Asakawa | |
| 6,035,465 A | 3/2000 | Rogozinski | |
| 6,045,320 A | 4/2000 | Cullen | |
| 6,095,349 A | 8/2000 | O'Meara | |
| 6,138,991 A * | 10/2000 | Myers, Jr. | B66C 23/44 |
| | | | 212/180 |
| 6,202,868 B1 | 3/2001 | Murray | |
| 6,631,886 B1 * | 10/2003 | Caudle | B66D 1/00 |
| | | | 254/338 |
| 6,830,423 B1 * | 12/2004 | Williams | A61G 3/0209 |
| | | | 212/180 |
| 6,981,834 B1 | 1/2006 | Henry | |
| 7,377,740 B2 * | 5/2008 | Panzarella | B60P 1/5433 |
| | | | 212/180 |
| 7,462,138 B2 | 12/2008 | Shetty et al. | |
| 7,657,951 B2 | 2/2010 | Tally | |
| 7,798,761 B2 * | 9/2010 | Goodrich | A61G 3/061 |
| | | | 414/540 |
| 7,878,484 B2 | 2/2011 | Kitchens, Sr. | |
| 8,231,109 B2 * | 7/2012 | Peng | B65H 75/28 |
| | | | 242/532.6 |
| 8,720,865 B2 * | 5/2014 | Anderson | B66D 1/04 |
| | | | 254/342 |
| 9,283,130 B2 | 3/2016 | Walker et al. | |
| 9,415,981 B2 * | 8/2016 | Heravi | B66D 1/12 |
| 2007/0246436 A1 * | 10/2007 | Picard | B60P 1/5433 |
| | | | 212/292 |
| 2011/0016628 A1 | 1/2011 | Masterson, Jr. | |
| 2012/0319064 A1 | 12/2012 | Selkowitz | |
| 2014/0144861 A1 | 5/2014 | Davis | |
| 2015/0307332 A1 * | 10/2015 | Huang | B66D 1/12 |
| | | | 254/323 |
| 2017/0137265 A1 | 5/2017 | Menville | |
| 2019/0308854 A1 | 10/2019 | Magill et al. | |

FOREIGN PATENT DOCUMENTS

| | | | | |
|---|---|---|---|---|
| EP | 2888976 A1 * | 7/2015 | | A47C 17/84 |
| GB | 2431631 A * | 5/2007 | | A61G 7/1015 |
| KR | 101296890 B1 * | 8/2013 | | A61G 7/1015 |
| WO | 9908955 A1 | 2/1999 | | |
| WO | WO-2005053178 A1 * | 6/2005 | | A61G 3/061 |
| WO | 2005092776 A1 | 10/2005 | | |
| WO | 2018091918 A1 | 5/2018 | | |

* cited by examiner

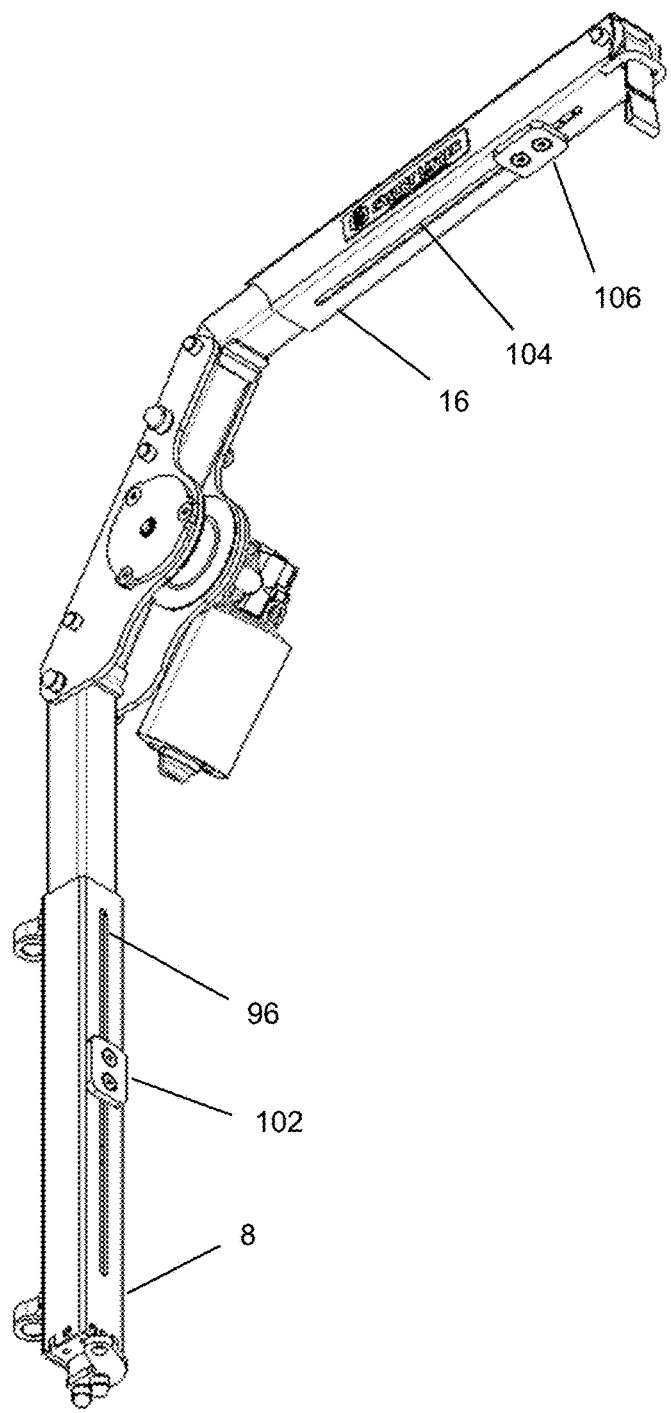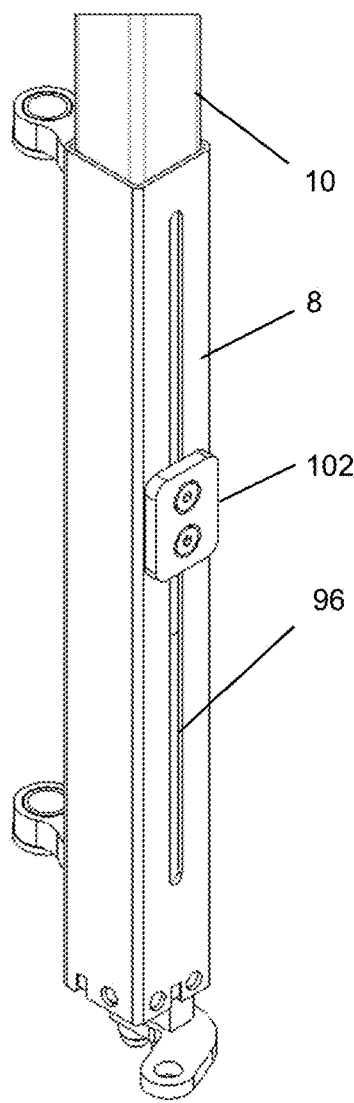
Figure 14
Figure 15

HOIST MECHANISM

CROSS-REFERENCE TO RELATED APPLICATION(S)

This application claims priority to GB Application Patent Serial No. 2003138.1, filed Mar. 4, 2020, the entire disclosure of which is hereby incorporated by reference.

TECHNICAL FIELD

The present invention relates to a hoist mechanism for loading a powered or non-powered vehicle into an automobile, particularly for loading a mobility scooter or wheelchair into an automobile.

BACKGROUND

A prior art hoist mechanism is disclosed in EP2578197. The hoist mechanism comprises an L-shaped boom member 15 rotatably mounted to post 10 fixed to a vehicle. The boom 15 can therefore rotate about a vertical axis such that the boom can extend out of the vehicle. An actuator 20 can extend/retract to allow the boom to rotate about a horizontal axis 16. The boom 15 can then be attached to a mobility scooter, thereby providing for lifting or lowering of the scooter accordingly.

To accommodate the actuator 20, the boom 15 must extend in a diagonal direction. This means the boom 15 takes up considerable space within the vehicle when not being used.

In existing prior art solutions, the boom is configured to remain substantially static and the hoist uses a winch-like system extending from the boom to lift or lower the scooter using webbing.

The inventor has found numerous drawbacks with the prior art system, at some of which concern the loading on the webbing and hoist mechanism when a wheelchair or scooter is suspended. It has been found that excessive loading can lead to degradation of the hoist system over time and can cause more immediate risks for the operator whilst a scooter or wheelchair is elevated. However resolving such drawbacks is typically at odds with the need to occupy a minimal interior space within the vehicle. It is conventional to provide an actuator in the form of an electric motor that is overpowered, i.e. to be able to cope with excessive loading.

SUMMARY

The present invention aims to overcome or ameliorate one or more of the drawbacks of the prior art hoists.

The present invention concerns a hoist mechanism arranged to be mounted in an automobile for lifting an article into/from an interior of the automobile, comprising: a boom configured to support the article in use and comprising first and second arms, the first arm being arranged to be mounted in an upright orientation within the vehicle and the second arm mounted to the first arm at an angle defined between a longitudinal axis of each arm; and, a motor arranged to drive retraction of webbing along the second arm for lifting of articles in use. In some embodiments, the first and second arms may comprise a single arm (e.g. they form an integral member).

According to a first aspect of the invention, there is provided a hoist mechanism according to appended claim 1.

The motor is supported on the first and/or second mounting bracket via a secondary bracket (i.e. fixing plate) removably mounted on first and/or second mounting bracket.

A secondary bracket is removably mounted to the first and/or second mounting bracket opposing the motor, the secondary bracket comprising an aperture or recess therein configured to support the spool.

Preferably, the secondary bracket comprises plate. Preferably, the second bracket is circular.

Preferably, the secondary bracket comprises a dry bearing configured to support the spool. Preferably, the dry bearing is provided in an aperture or recess within the secondary bracket. Preferably, the dry bearing comprises a self-lubricating bearing.

Preferably, the boom comprises a first portion angled relative to a second portion, the first and/or second mounting bracket spanning the first and second portion.

Preferably, the mounting bracket forms a side wall of an arm of the boom. Preferably, the spool is supported beneath the boom by the mounting bracket (i.e. slung thereunder).

Preferably, the hoist mechanism comprises a controller to configured to supply power to the electric motor for actuation thereof, the controller further configured to monitor one or more electrical parameter of the actuator or the power supply thereto, determine whether the one or more electrical parameter is within one or more predetermined threshold, and to selectively control the power supply to the actuator according to said determination.

This may reduce the risk of increased and/or unexpected loads on the actuator, thereby allowing the use of a smaller and/or low power actuator. This can reduce the weight, size and/or power usage of the hoist.

The controller may be configured to reduce or deny power to the actuator when the one or more predetermined condition is met.

The electrical characteristic may comprise an electrical current/power level for the motor. The pre-determined condition may comprise an absolute value, a change and/or rate of change in electrical current or power above a predetermined threshold.

The controller may be operatively connected to a user input device configured to provide commands to the controller for operation of the electric motor. A user interface may provide user/manual control input means configured to provide commands to the controller for operation/actuation of the hoist. The control input means may be provided as a handset, which may be waterproof. The controller may be contained within a waterproof housing.

The handset may comprise a magnet and/or magnetic material and the hoist comprises a corresponding magnet and/or magnetic material to allow releasable attachment of the handset to the hoist.

The controller may monitor ongoing usage of the hoist and/or maintain a log of one or more usage parameter, e.g. in a non-volatile memory. The controller may increment the log according to and/or during an instance of use of the hoist/actuator. The controller may compare the log against one or more predetermined criterion in order to output an indication of the operational health of the hoist. The controller may be configured to indicate whether a service of the hoist is required according to one or more service condition determined by the controller.

The service condition may comprise one or more of: a predetermined period of time; a number of lifting/lowering cycles of the hoist; a number of times the hoist is powered on/off; a period of time the actuator is in use; or a total amount electrical energy used.

A user input means/interface for the controller may comprise a plurality of buttons to permit control of the hoist.

The actuator may be configured to retract the webbing to provide lifting of the article. The hoist may comprise a locking mechanism configured to lock the actuator, webbing and/or a spool for the webbing when the actuator is inactive.

The actuator may comprise an electrical motor.

Preferably, the electric motor is mounted to the boom in an orientation in which the electric motor extends in a direction substantially parallel with an arm of the boom, the hoist mechanism further comprising a gearbox between an output shaft of the motor and the webbing, wherein the gearbox comprises an output shaft angularly offset from the output shaft of the motor.

According to a further aspect, there is provided a hoist mechanism arranged to be mounted in an automobile for lifting an article into/from an interior of the automobile, comprising: a boom configured to support the article in use and comprising first and second pivotally connected arms, the first arm being arranged to be mounted in an upright orientation within the vehicle and the second arm moveable relative to the first portion between a raised position and a lowered position so as to vary the angle defined between a longitudinal axis of each arm; a motor arranged to drive retraction of webbing along the second arm for lifting of articles in use; and, a releasable locking mechanism configured to retain the second arm in the raised position.

The locking mechanism may comprise a lever rotatably mounted to one of the first arm and the second arm about a pivot point and having an engagement formation, the engagement formation being releasably engageable with an opposing engagement formation on the other of the first arm and the second arm in the raised position so as to prevent relative movement of the first and second arms, the lever being manually rotatable relative to the first and/or second arm whilst in the raised condition to disengage the opposing engagement formations to permit movement of the second arm relative to the first arm to the lowered position.

The lever may comprise a handle portion, e.g. disposed a greater distance from the pivot point than the engagement formation. The lever may comprise a lever arm extending to one side of the pivot point and the engagement formation may be provided on the other side of the pivot point from the lever arm/handle portion.

The first and second arms of the boom may be pivotally connected for rotation about an axis. The pivot point of the lever may or may not be spaced from the axis. The lever may be pivotable about a pivot axis that is parallel with the axis.

One of the opposing engagement formations may comprise a pin. The other of the opposing engagement formations may comprise an elongate groove or hook arranged to receive the pin.

The engagement formation may be mounted so as to be urged into an engaged condition with the opposing engagement formation, or vice versa, by a moment caused by the weight of the second portion.

The locking mechanism may be configured such that the opposing engagement formations are at least partially disengaged by raising/rotating the second arm relative to the first arm. The locking mechanism may be configured such that the opposing engagement formations are at least partially disengaged by rotation of the lever, e.g. concurrently with or subsequent to raising/rotating the second arm. When the second arm is released, the second arm may be lowered under gravity.

One of the opposing engagement formations may be shaped to guide the other to/from an engaged or disengaged condition. Said engagement formation may have a cam/profiled surface, along which the other can ride. Said engagement formation may comprise an abutment to prevent further movement of the other engagement formation, or corresponding arm, beyond a disengaged position. The abutment may be provided at an end of the profiled surface, e.g. such that the profiled surface runs from the abutment to the groove.

The hook/groove member may comprise a stop member, the pin being configured to engage the stop member when the second portion is in the retracted state.

The first and/or second arm of the boom may be length adjustable, e.g. extendable and/or telescoping. The first and/or second arm may comprise concentric/overlapping arm portions, which may take the form of hollow/tubular members.

A clamp member, e.g. a releasable clamp member, may hold the arm portions of the first and/or second arm at a desired length of overlap. The clamp member may be fastened to one of the arm portions via an opening, e.g. an elongate opening or slot, in the other arm portion.

According to a further aspect, there is provided a hoist mechanism for lifting articles into an interior of an automobile comprising: a boom configured to support the scooter in use; a length of webbing configured to be secured to the article in use; an actuator mounted to the boom and comprising a spool, the webbing connected to the spool such that the actuator is configured to wind the webbing onto the spool for lifting of the article in use; where the webbing is attached to the spool via a hub portion, the hub portion is mounted to a rotatable spindle driven by the actuator.

The hub portion may be removably attached to the spindle.

The hub portion may comprise a recess configured to receive an end of the webbing and a pin configured to extend through at a least a portion of the recess to engage and secure the end of the webbing within the recess, the pin being removably engageable with the hub, such that the webbing is removably secured to the hub.

The pin may be accessible from a side of the hub such that the webbing is detachable from the hub whilst the webbing is still wound thereon.

The spool may comprise a plurality of side walls configured to extend either side of the webbing in use (e.g. to constrain the webbing there-between) and rotate in unison with the hub/spindle, preferably, wherein the side walls extend into a cut-out in the boom.

The boom may comprise one or more roller configured to support the flexible member extending along the length thereof. The roller may comprise a plurality of side walls configured to extend either side of the webbing in use (e.g. to constrain the webbing there-between) and to rotate in unison with eh roller.

The side walls may be spaced by a distance approximately equal to, or slightly larger than the width of the webbing The rollers may be mounted to the boom via a one or more bush, e.g. where the bush comprises a dry bearing and/or a self-lubricating bearing.

The hoist mechanism of any aspect may be arranged to be mounted in the automobile/vehicle, e.g. within a boot/trunk thereof.

Any of the optional or essential features defined in relation to any one aspect may be applied to any further aspect of the invention, wherever practicable. Different embodiments may comprise different combinations of the features defined above from the specific feature combinations defined above.

BRIEF DESCRIPTION OF THE DRAWINGS

Practicable embodiments of the invention are described in further detail below by way of example with reference to the accompanying drawings, of which:

FIGS. 14-17 show details of a clamping member of the hoist;

DETAILED DESCRIPTION

Figure 1A:
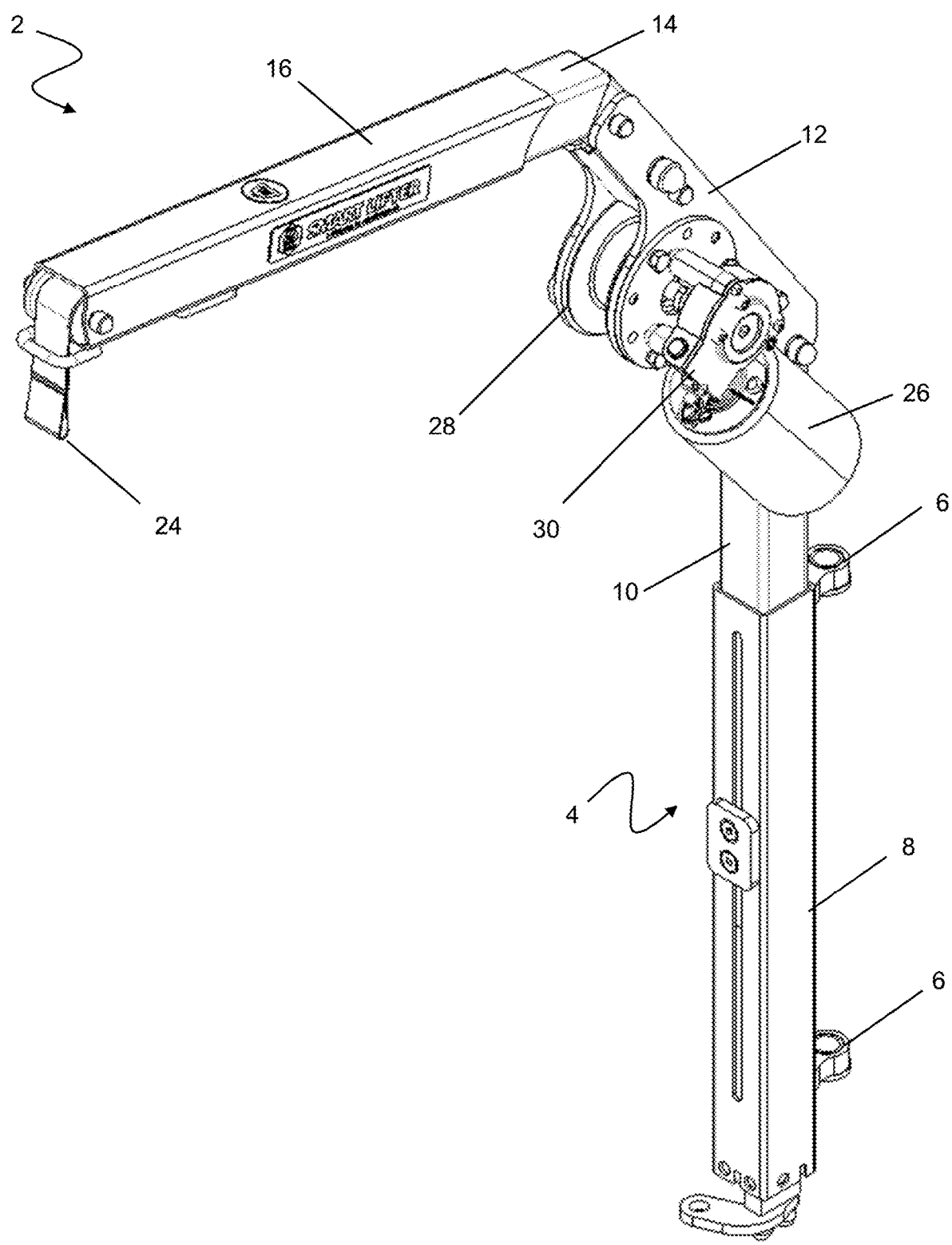
FIGS. 1a and 1b show a first isometric view of a hoist mechanism.

FIGS. 1a, 1b, 2a and 2b show a hoist mechanism 2 for lifting a powered or non-powered mobility aid into a vehicle. For example, the powered or non-powered mobility aid may comprise a mobility scooter, electric wheelchair, manual wheelchair and/or other walking aids required by people with reduced mobility. Although the present invention is intended to lift such mobility aids, it can be appreciated that the user may use the hoist to the lift other heavy loads, as required.

The hoist mechanism 2 is configured to be fixed to the vehicle adjacent a door or other opening, for example, a boot/trunk door, to allow the user to place the load inside the vehicle.

The hoist mechanism 2 comprises a boom generally indicated at 4. The boom 4 is configured to be rotationally attached to the vehicle. The boom 4 comprises a plurality of connectors 6 to allow a connection to a post or other fixture within in the car. The connectors 6 comprise apertures/loops to permit rotation relative to the post. The hoist 2 may therefore be stored inside the vehicle when not in use and then swung out of the vehicle when required. A rotatable connection may also be provided at a base of the boom 4. The boom is thus swivelable as a whole about an upright/vertical.

The boom 4 comprises a metallic beam, for example, a steel box-section.

The connectors 6 are connected to a first boom member 8, i.e. such that the first boom member is secured in an upright, e.g. vertical, orientation within the car.

A second boom member 10 is telescopically connected to the first boom member 8 (i.e. slidable relative thereto), thereby allowing height adjustment of the hoist mechanism 2 in use. This allows users to adjust the hoist mechanism 2 according to the height of the vehicle interior. The first 8 and second 10 boom members thus form an upright, height-adjustable mast.

A third boom member 12 is connected to the second boom member 10. The third boom member is attached at its proximal end to the second boom member 10, e.g. to the mast.

The third boom member 12 is angled with respect to the first and second boom members forming the mast, such that an elongate axis of the third boom member forms an angle with respect to the elongate axis of the first/second boom member. The third boom member 12 is typically obliquely angled when in use and may form an interior angle of greater than or equal to 90° but less than 180° (e.g. offset from the mast by 45 degrees, or an interior angle of 135°).

A fourth boom member 14 is connected to the third boom member 12 at its distal end. The third boom member 12 thus forms an intermediate member between the mast and fourth boom member 14.

The fourth boom member is angled with respect to the third boom member 12, such that an elongate axis of the third boom member forms an angle with respect to the elongate axis of the fourth boom member. The fourth boom member 14 is typically obliquely angled from the third boom member and may form an interior angle of greater than or equal to 90° but less than 180° (e.g. offset by 45 degrees, or an interior angle of 135°). The fourth boom member 14 extends in a substantially horizontal direction in use (e.g. is perpendicular to the first/second boom members).

A fifth boom member 16 is telescopically connected to the fourth boom member 14, e.g. oriented along a common axis. The fourth and fifth boom members thus define a length-adjustable armature.

The boom 4 is therefore extendible in two orthogonal directions (i.e. horizontal and vertical) by virtue of the length-adjustable mast and armature.

Figure 1B:
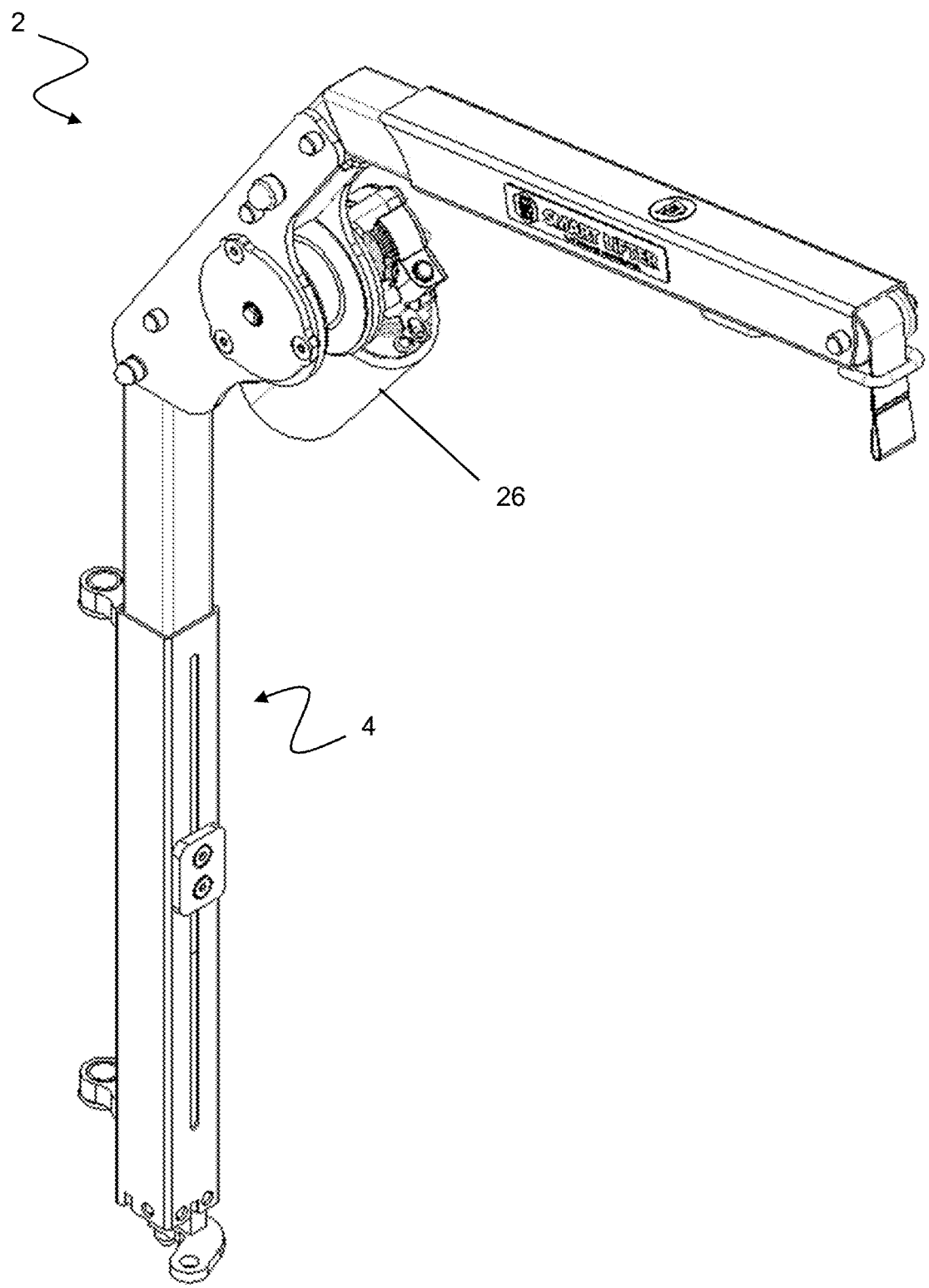
Figure 3:
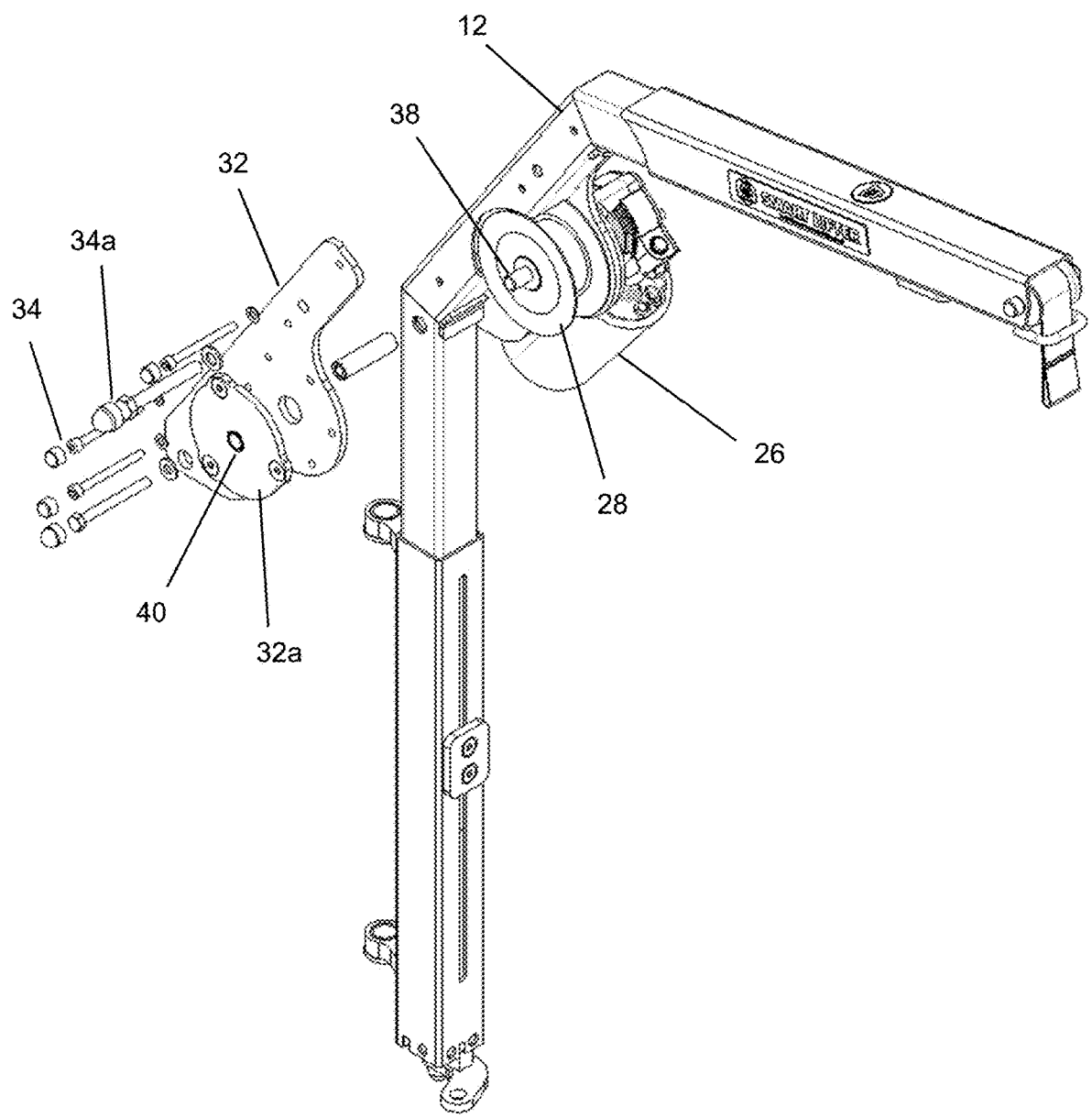
FIG. 3 shows a first close-up view of a mounting bracket.

In a first embodiment shown in FIGS. 1a and 1b, the angular orientations of the boom members making up the boom 4 is substantially fixed/rigid. As shown in FIG. 3, the second, third and fourth boom member may be formed from a single, unitary piece, thereby preventing relative rotation there-between.

Figure 2A:
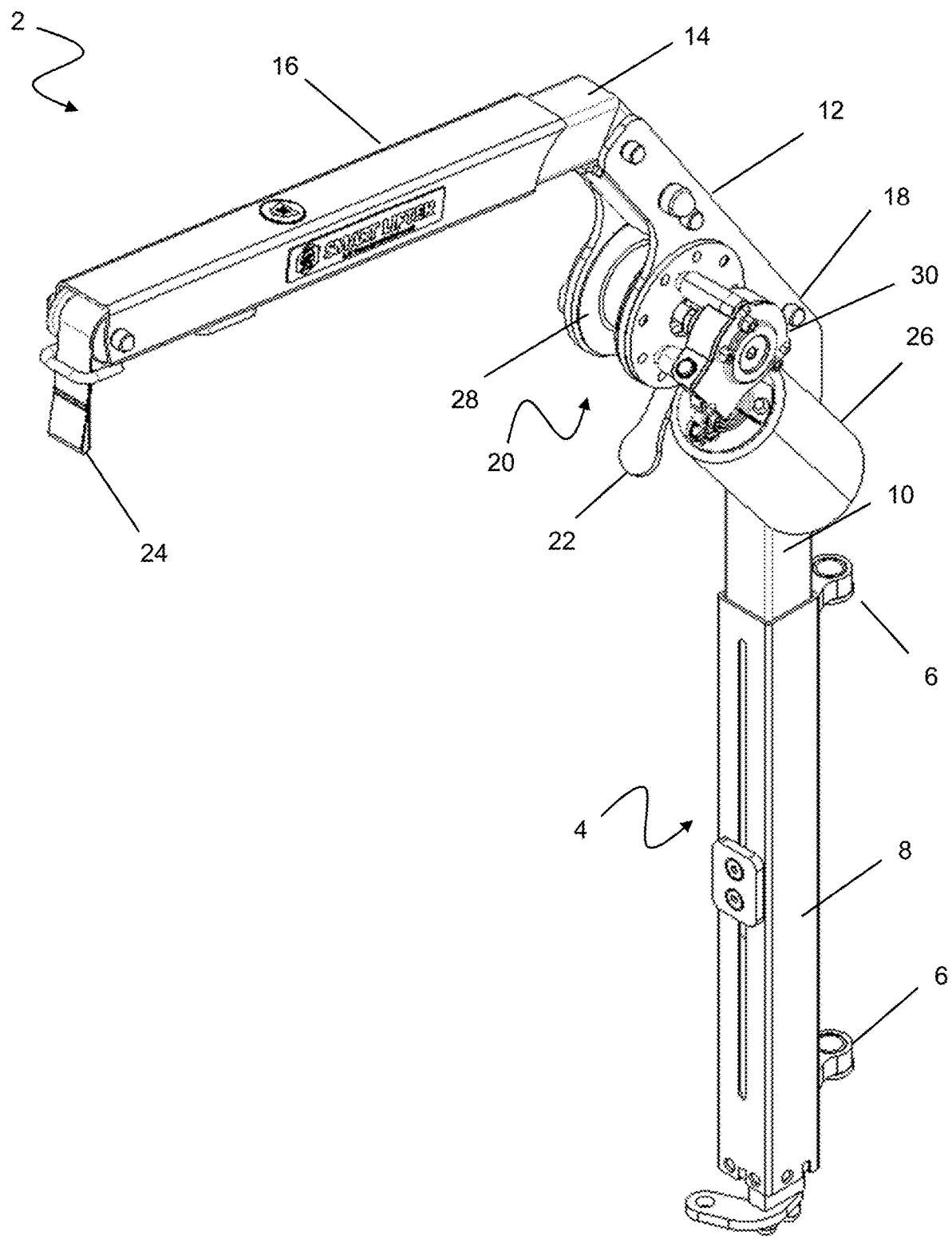
FIGS. 2a and 2b show a second isometric view of a hoist mechanism.
Figure 2B:
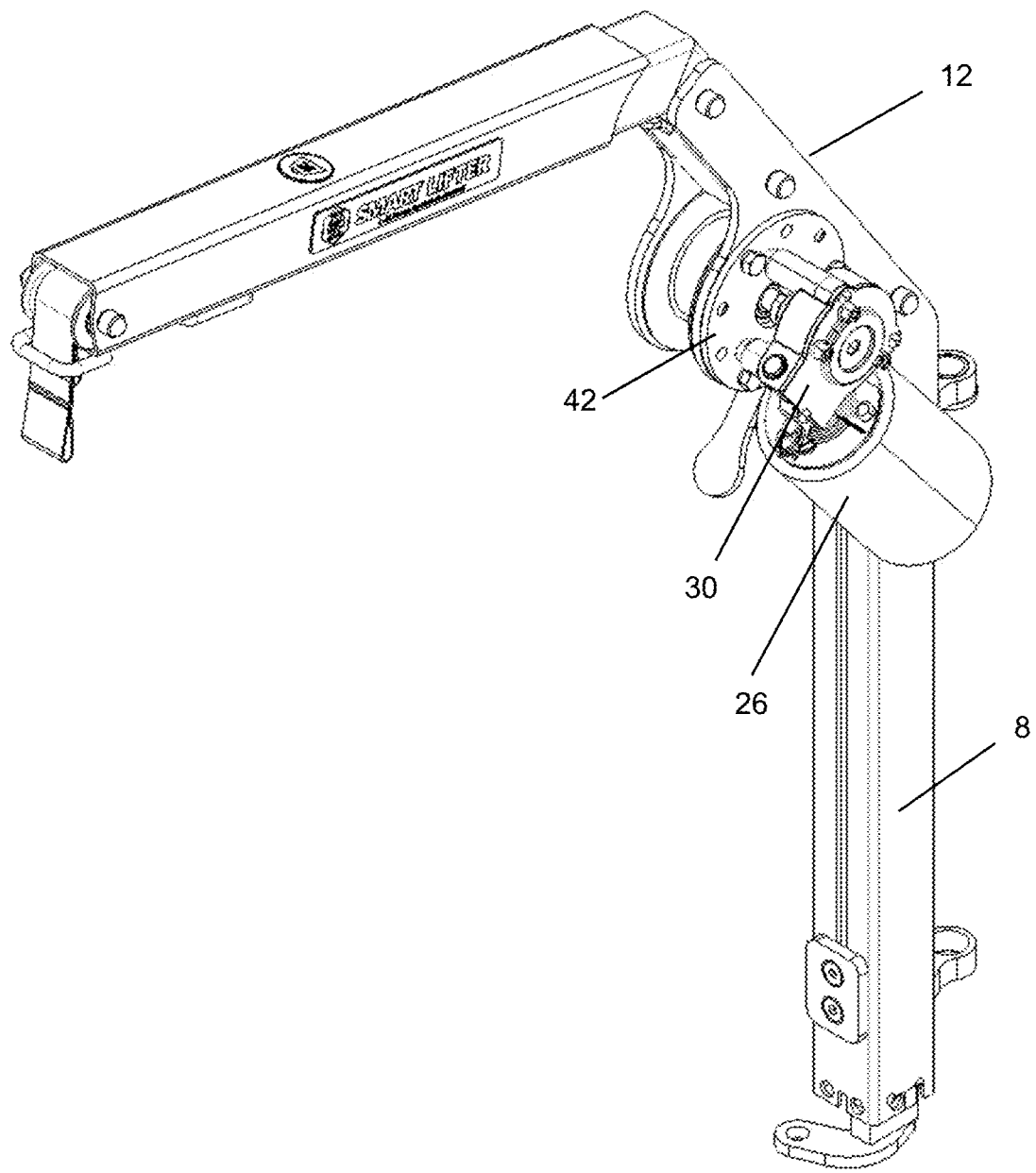

In a second embodiment shown in FIGS. 2a and 2b, at least one of the second 10 and fourth 14 boom member is configured to allow selective angular adjustment with respect to the third/intermediate boom member 12 (e.g. to provide a rotatable joint). The joint allows rotation about a substantially horizontal axis formed at the interface between the respective adjacent boom members.

The joint is provided in this example between the mast (first/second boom member) and an upper armature (provided by the third, fourth and fifth boom member) of the boom 4 by pivot 18 there-between. That is to say, the pivot is provided between the second 10 and third 12 boom members.

A locking mechanism 20 locks the adjacent boom members into a fixed orientation, operation of which will be described later. The locking mechanism 20 comprises a handle 22 to provide release of the locking mechanism. The locking mechanism 20 is described in further detail later.

Webbing, referred to herein as a belt 24, depends from the boom structure 4 over the distal/free end of the fifth boom member 16 and is configured to be attached to the article to be lifted, e.g. a mobility scooter.

An actuator 26, in the form of an electric motor, is mounted to the boom 4 structure. In this example the actuator 26 is mounted to the intermediate/third boom member 12 along with a spool for the belt 24. The actuator comprises an electric motor oriented substantially in parallel with the boom member to which it is mounted, e.g. having an output shaft that rotates about an axis that is substantially parallel with the elongate axis of the boom member).

The actuator 26 may draw power from the vehicle's on-board electric system.

The belt 24 is operatively connected to an actuator 26 to retract/extend the belt 24. The belt 24 extends through/along a hollow interior the boom 4, e.g. through boom members 14 and 16, thereby preventing the user interfering with the belt 24.

The belt 24 is connected to a spool 28 and the belt 24 is configured to be wound to/from the spool 28 by the actuator 26. The hoist 2 therefore provides a winch like arrangement for selective payout/retraction of the belt 24.

Upon a predetermined degree of retraction (e.g. when fully retracted), a locking mechanism (not shown) may lock the actuator 26 and/or the spool 28 in place. For example, a locking pawl/arm may act on a toothed/gear of the spool, and/or the actuator 26 may comprise a rotational position lock (i.e. a lock built into the motor). The locking mechanism may be unidirectional, e.g. locking in a direction of passive payout of the belt. This prevents unwinding of the belt 24 when power is not supplied to the actuator 26 (e.g. when loaded into the vehicle). The locking mechanism may automatically lock the actuator 26 and/or the spool 28 when a desired retracted position is reached. Alternatively, the locking mechanism may be manually applied by the user. The locking mechanism may comprise a ratchet or the like. The locking mechanism can be automatically released by power supplied to the actuator when lowering/raising the scooter (i.e. during extension of the belt 24).

In other embodiments, a different webbing type may be used to attach to the scooter, for example, a chain, a rope, or the like.

The actuator 26 comprises a gearbox 30 connecting to the spool 28 to the electric motor 26. The gearbox 30 can be tuned to provide the appropriate rate of rotation for the spool 28 and/or force of retraction etc., as is conventional. Additionally or alternatively, the gearbox 30 allows a change of the axis of rotation between the actuator 26 and the spool 28. This allows mounting of the actuator 26 on the side of the boom 4, and/or parallel with a boom member, thereby providing a compact configuration. The gearbox 30 output shaft may be perpendicular to its input shaft and/or the output shaft of the electric motor.

Figure 4:
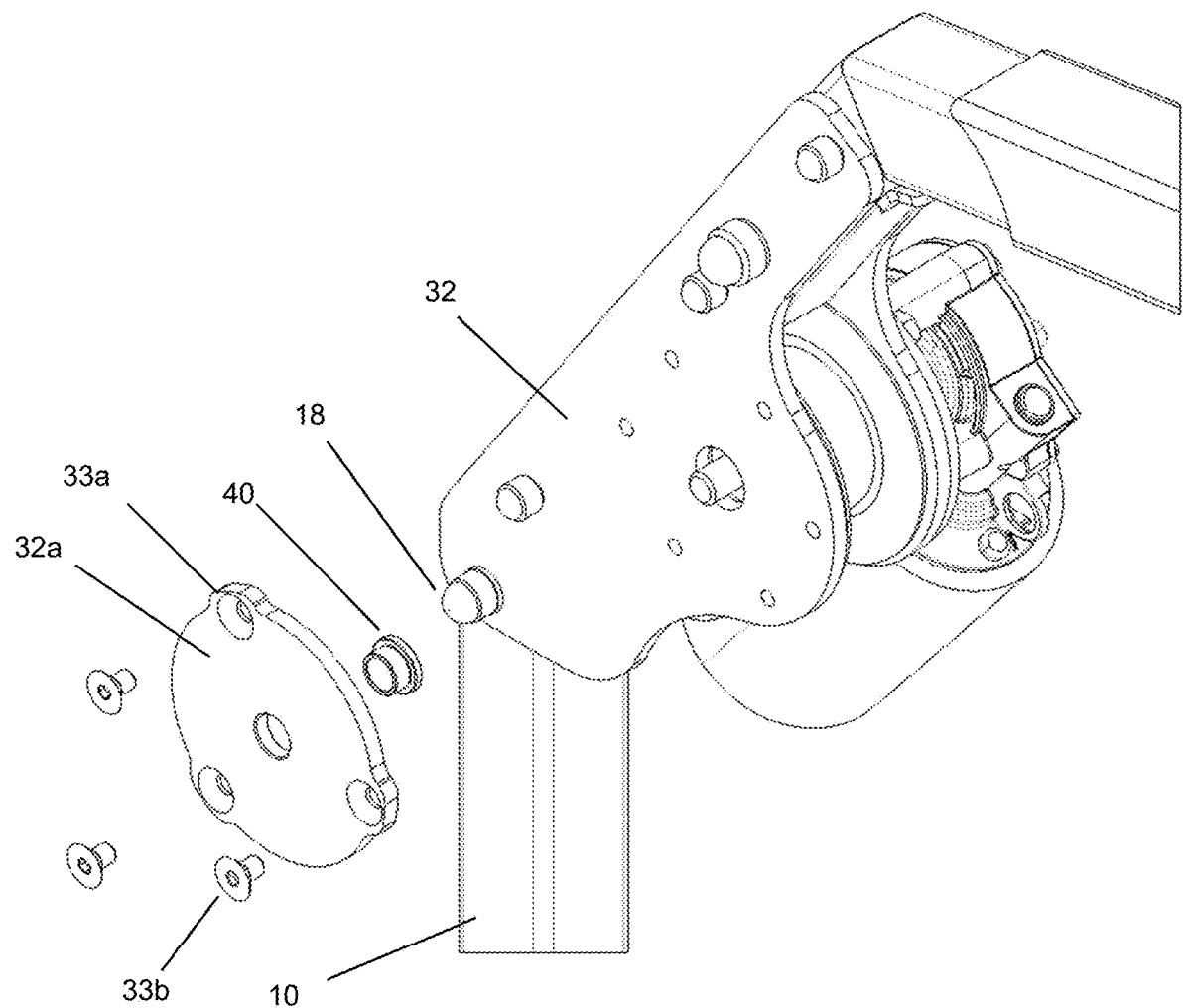
FIG. 4 shows a second close-up view of a mounting bracket.

As shown in FIGS. 3 and 4, a mounting bracket 32 is configured to extend between the adjacent second/third/fourth boom members. The bracket 32 is provide on the side of the boom. The bracket 32 is attached to the boom 4 via a plurality of fasteners 34. The bracket 32 is therefore removable, for example to allow access to the spool 28 etc. The bracket 32 is shaped to cover/enclose the spool 28, i.e. for mounting of the spool relative to the respective boom member.

The bracket 32 is configured to support a spindle 38 configured to drive the spool 28. An opening in the bracket 32 receives the spindle 38. A secondary bracket 32a is mounted onto the bracket 32 on an opposing side of boom 4 to the motor 26. The secondary bracket comprises a plurality of apertures 33a provide selective attachment of the secondary bracket 32a to the bracket 32 via a plurality fasteners 33b. This allows swapping of the position of the motor 26 on either side of the boom, thus allowing multiple configurations of the boom in a vehicle. Additionally, this provides a significantly increased ease of maintenance.

The secondary bracket 32a comprises a bearing 40 configured to support the spindle 38, thereby permitting rotation of the spindle relative to the bracket 32 and secondary bracket 33. Supporting the shaft on a single bearing 40 reduces any alignment issues caused, for example, if a bearing is placed on the bracket 32 on each side of the boom 4. Improved alignment of the shaft reduces motor noise and vibration; extends motor life; and minimizes the power needed to lift a given load A mounting bracket 32 is provided each side of the boom 4. The spindle 38 therefore spans the brackets 32 and is supported thereby. A fastener comprising a standoff 34a extends through the boom 4 and connects bracket 32 mounted on opposing sides thereof. The standoff 34a increases the clamping force between the opposing brackets 32.

The bracket 32, as well as providing a mounting structure for the spool 28, may reinforce the corner of the boom 4, i.e. providing a rigid structure spanning the interface between two adjacent boom members. The bracket 32 thus provides a mounting bracket.

Best seen in FIGS. 2a and 2b, a fixing plate 42 is connected to the bracket 32 at an outer side thereof and adjacent the gearbox 30. The fixing plate 42 provides a mounting point for the gearbox 30 and/or motor, i.e. the actuator 26. The actuator 26 is therefore held on the boom 4 via the gearbox (e.g. via a housing thereof) and the mounting bracket 32. The fixing plate 42 may be removably mounted to the bracket 32 (e.g. via fasteners or the like). In other embodiments, the fixing plate 42 may be integral with the bracket 32. In this way, the actuator 26 has a single mounting point that is common with the spool fixture. Additionally, the fixing plate evenly distributes the load from the gearbox/motor, thereby preventing deformation of the mounting bracket 32.

The mounting bracket 32 provides a firm and rigid base to mount the actuator 26 and the gearbox 30. This ensures the spindle 38 is aligned with the axis of spool 28. Any misalignment of the spindle 38 and the spool 28 may cause additional an additional load on the actuator 26, thus the brackets 32 mitigate this issue.

Where the boom 4 comprises a joint, the pivot 18 can be formed between the bracket 32 and the second boom member 10. The bracket 32 therefore connects the rotatable boom members. A pin extends between bracket 32 on either side of the boom 4 and though the second member 10, thereby connecting the mounting bracket 32 and the second boom member 10. A bearing or the like may be provided between the pin and the second boom member 10 to aid rotation thereof.

The third boom member 12 may be formed of, or comprise, the bracket(s) 32.

Operation of the locking mechanism 20 is described with reference to FIGS. 5-7.

The handle 22 is connected to a lever 46. The handle 22 extends from the level at an angle thereto, e.g. approximately perpendicularly or at an acute angle, and comprises a tab-like member.

The lever 46 is rotationally connected to the mounting bracket 32 via pivot 48. The lever 46 is substantially L-shaped or V-shaped, e.g. with the pivot provided at the apex. The handle 22 is connected to a first end of the lever 46 and/or to one side of the pivot. An opposing end of the lever 46, e.g. on the other side of the pivot comprises a pin 50 in this example.

The handle 22 and pin 50 could be on the same side of the pivot in other examples at different radial spacings from the pivot.

Figure 5:
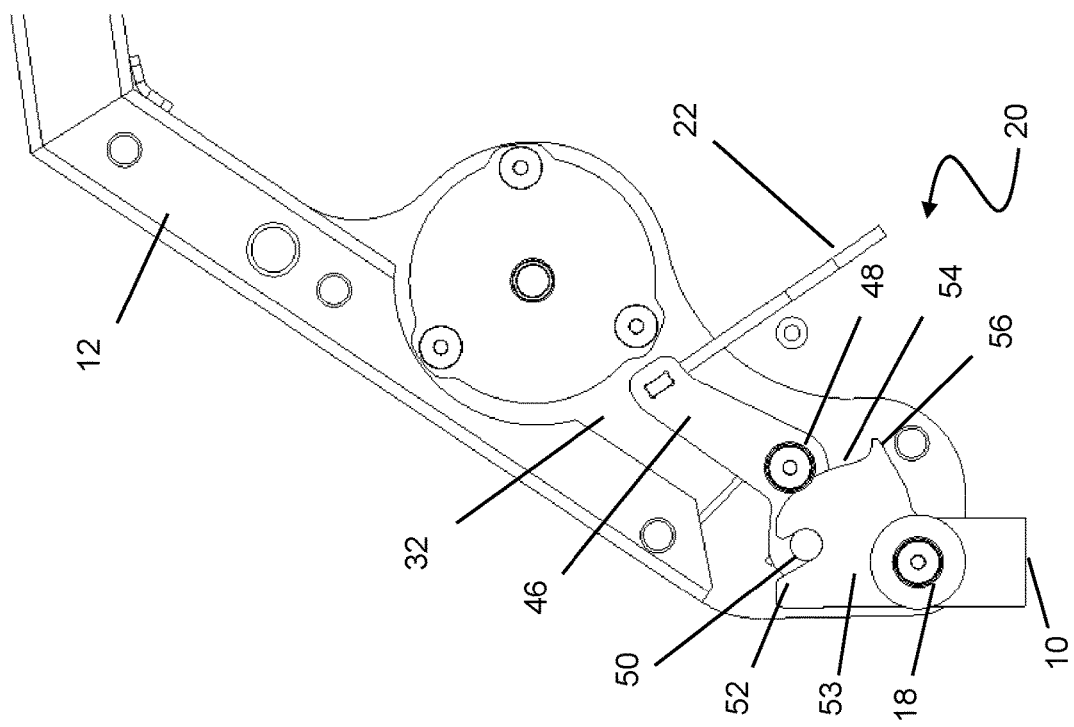

In an extended position shown in FIG. 5, the pin 50 is received within a groove 52 in an engagement member 53 depending from the pivot 18 and/or the second boom member 10. The engagement of the pin 50 and the groove 52 prevents relative movement of the mounting bracket and the second boom member 10, and therefore prevents relative movement between the upper and lower portion.

The groove 52 is open ended and extends in a downward direction away from the open end, e.g. to provide an engagement formation for receiving the pin 50. The groove 52 angled with respect to the axis of the second boom member 10 in a direction toward the rotation of the upper portion. As such, the pin 50 is biased into the end groove 52 by the weight of the upper portion (i.e. the upper portion is inclined to rotate under gravity such that the pin 50 goes into the groove 52). Additionally or alternatively, the pin 50 is biased into the groove 52 by a torsion spring or the like extending between the lever 46 and the mounting bracket. The groove 52 in the engagement member 53 therefore provides a hook or latch type arrangement.

Figure 6:
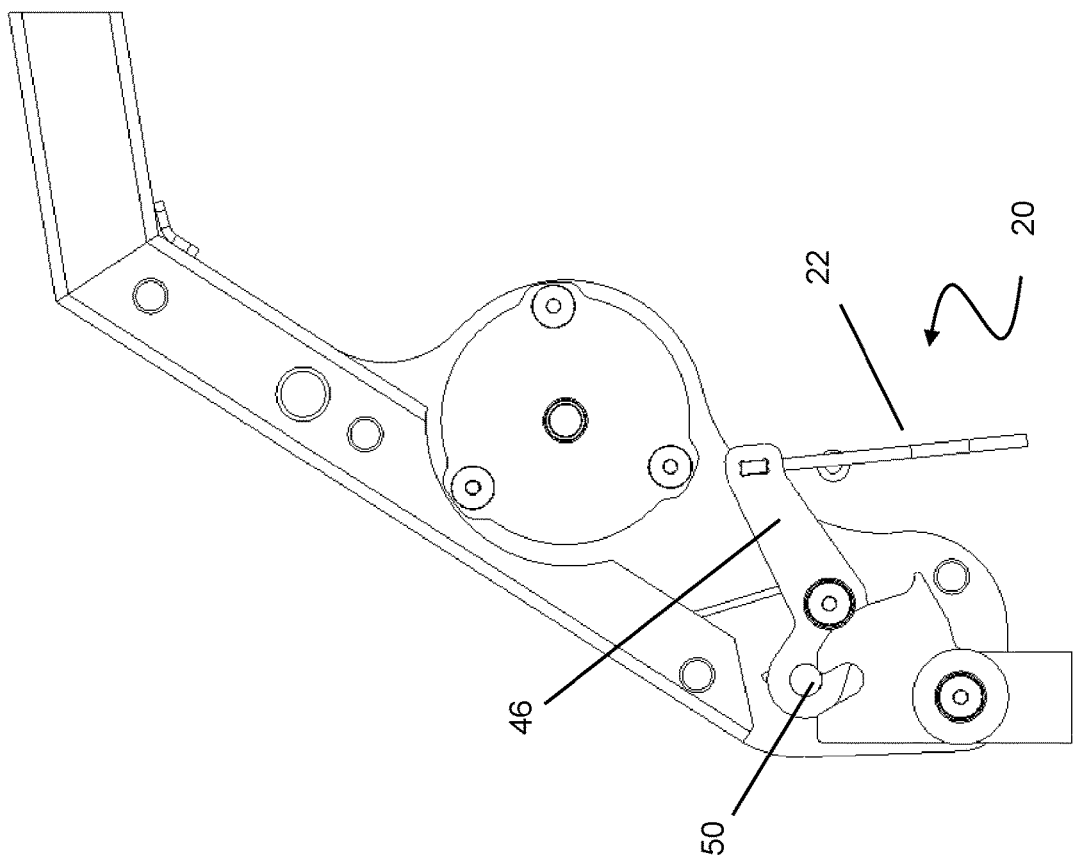
FIGS. 5-7 show a section view of a locking mechanism.

As shown in FIG. 6, to unlatch the joint, the lever 46 is rotated by pressing on handle 22, such that the pin 50 moves along the groove 52 to its open end. The pin 50 moves beyond the groove 52 end under the lever action until it is no longer in engagement therewith. The pin 50 is therefore unlatched. The rotatable portion of the boom armature (i.e. boom members 12, 14, 16) may be lifted upward (i.e. in an anti-clockwise direction) to help release the pin from the groove.

Figure 7:
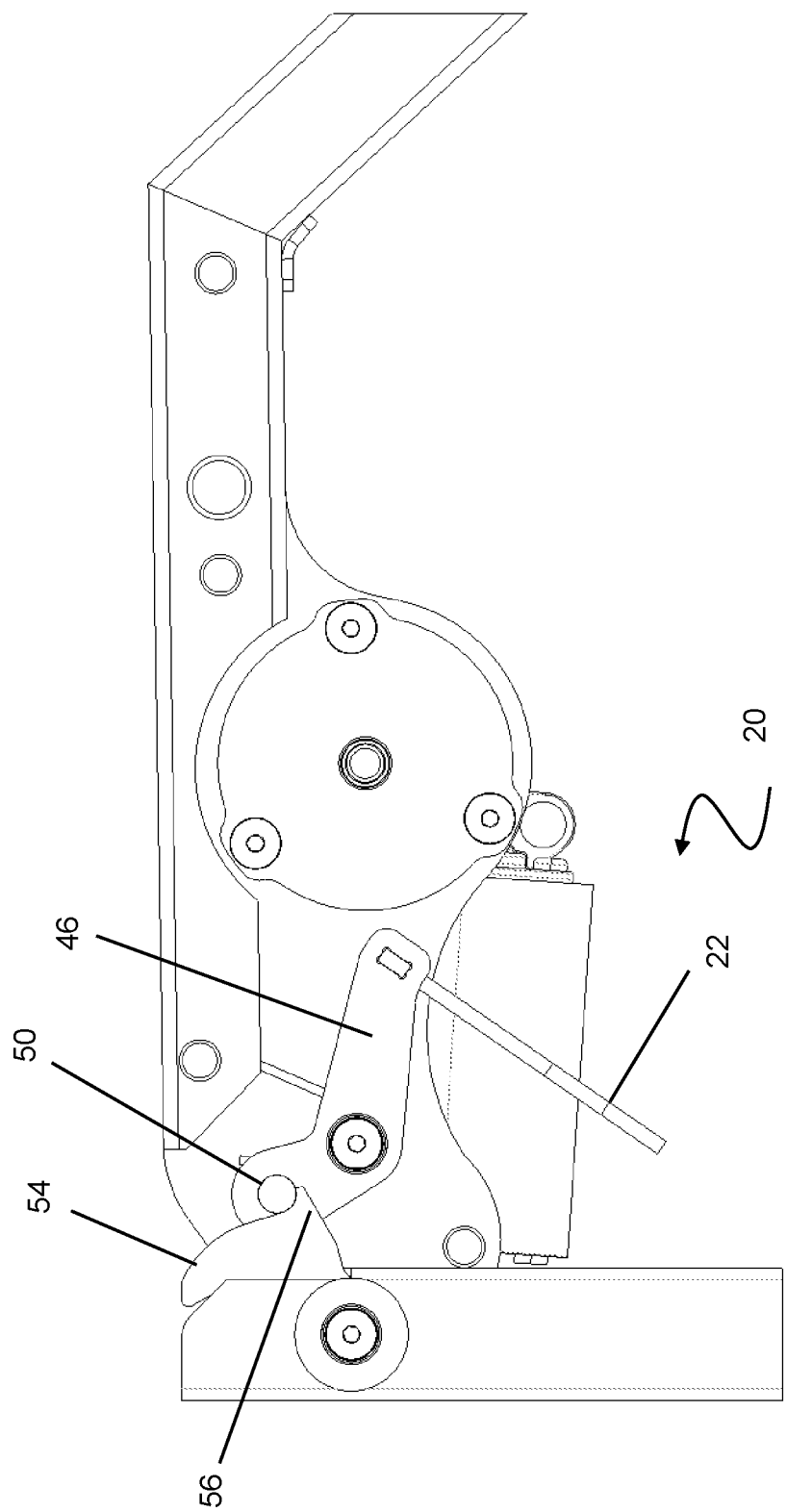

As shown in FIG. 7, the upper portion of the boom 4 may then be released such that it can move downwards due to gravity. As the lever 46 has been rotated the pin 50 does not re-engage the groove 52. The pin 50 engages a curved/cam surface 54 defined by an edge of the engagement member 53, and slides there along. The curved surface 54 is arcuate, such the pin 50 follows the surface 54 during rotation of the upper portion.

The surface 54 comprises a lip 56 or stop portion at an end thereof. The pin 50 engages the lip 56, preventing further movement of the pin 50. The lip 56 therefore holds the upper portion in a predetermined, retracted/lowered position. In this regard the engagement member 53 may comprise first and second engagement formations for engaging the pin in raised and lowered conditions.

In the lowered position, the third boom member 12 is substantially horizontal, and therefore the hoist 2 occupies less space.

To restore the upper portion back to the extend position, the user can raise the rotatable portion of the boom armature upward. The pin 50 slides along the curved surface until the pin 50 is adjacent the groove 52. The user then rotates the lever 46 or falls under gravity, such that the pin 50 enters the groove 52.

In other embodiments, the lever 46 and pin 50 arrangement may be provided on the lower power (i.e. the second boom member 10), with the pin 50 engaging a groove 52 on the upper portion.

Figure 8:
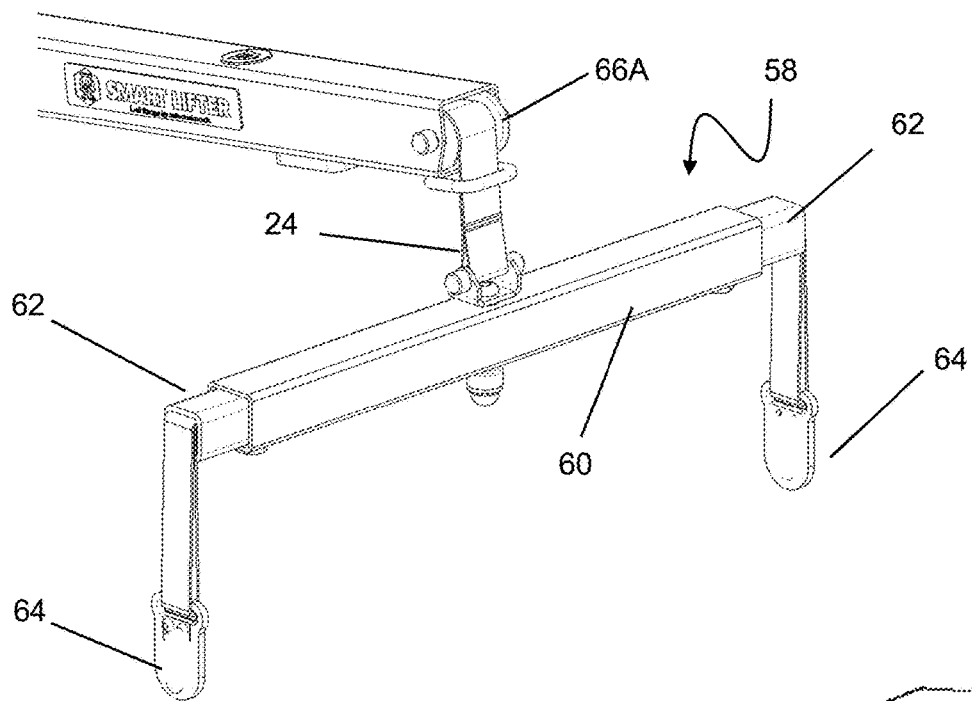
FIG. 8 shows a connection member of the hoist.

As shown in FIG. 8, the belt 24 comprises a connection member 58 to allow connection of the belt 24 to the scooter. The connection member 58 comprises a cross-bar or spreader-bar 60, arranged to be substantially horizontal use. End portion 62 are telescopically connected to the cross-bar 60, allowing variation of the width of the connection member 58. Connecters 64, such as shackles, karabiners or the like, are provided on each end portion 62 to allow a removable connection to lifting points on the scooter.

Figure 9:
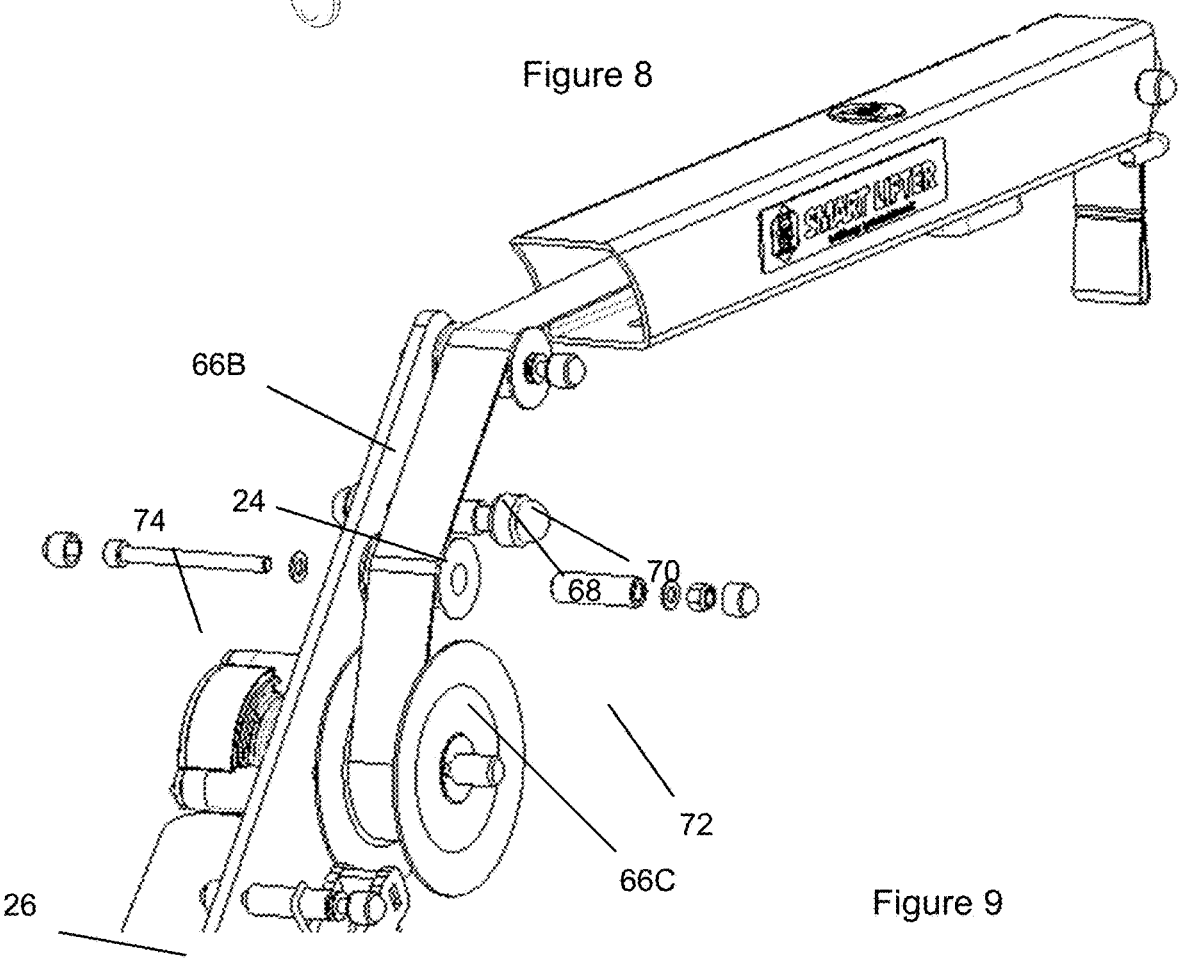
FIG. 9 shows an exploded view of a roller arrangement of the hoist.

FIG. 9 shows an exploded, part-cut-away view through the third boom member 12 and fourth boom member 14 and the belt spool and support members. The belt 24 runs from the end of fifth boom 16 to the spool 28 via the inside of the fifth boom member 16 and the fourth boom member 12.

The belt 24 is supported by a roller 66 at one or more location along the path between the spool and distal end of the boom, e.g. where the belt 24 changes direction of travel. For example, a first roller 66A is provided at the end of the boom (see FIG. 8), a second roller 66B at the intersection of the third and fourth boom member, and a third roller 66C adjacent the spool 28, e.g. controlling the direction of the belt running off the spool.

The/each roller 66 comprises a cylindrical surface 68 configured to engage and support the belt 24. The roller 66 comprises side walls or rims 70 one opposing sides of the intermediate surface 68 configured to bound/enclose the surface 68. The side walls 70 therefore ensure alignment of the belt on the roller surface when under load and prevent the belt 24 from slipping off the roller 66. This has been found to be particularly important under high loading and/or camber as it has been found that a belt can slip partially off conventional rollers, thereby causing the load to be exerted on the belt via a roller edge or bolt threads, which can cause the roller edge to cut into the belt. Additionally, any slipping of the belt 24 may cause additional load on the actuator 26.

The roller 66 is mounted to the boom 4 via a standoff 72 (i.e. a fixed roller/spacer) received within the roller 66. The standoff is mounted to the boom via a fastener 74. The roller 66 is mounted directly on the standoff 72 (i.e., there is no intermediate bearing). The roller 66 may rotate over the standoff via the natural lubricating properties of the roller 66 and/or standoff 72. For example, the roller 66 and/or standoff may comprise a low friction material, such as nylon. The rollers 66 are therefore low maintenance and reduce wear on the belt 24 and/or bearings.

In alternative embodiments, a pair of bushes support the roller 66 on the standoff. The bushes comprise a low friction material, to provide low resistance rotation of the roller 66 on the standoff 72 (i.e. a dry bearing). The bushes comprise a self-lubricating material, for example, oil-impregnated sintered bronze/iron (e.g. Oilite® bushes).

In other embodiments, the roller 66 is mounted to the standoff 72 via conventional ball bearings.

Figure 10:
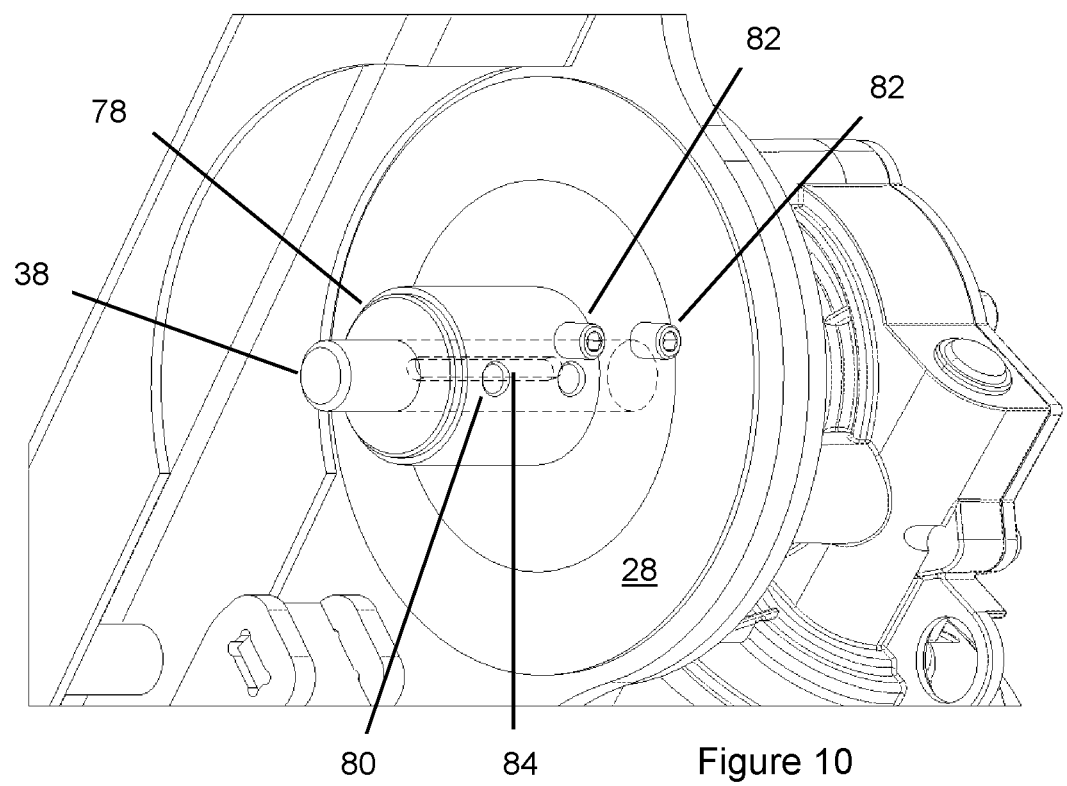
FIGS. 10-13 show partial close up views of a spool arrangement of the hoist.

As shown in FIG. 10, the spool 28 comprises a hub 78. The hub 78 is attached to the belt 24, such that the belt 24 is configured to wrap around the hub 78 during winding thereof. As shown in FIG. 10, the hub 78 comprises a plurality of apertures 80 extending there-through. The apertures 80 extend in a substantially redial direction, such that a pin/screw 82 may be inserted into the aperture and into engagement with a groove 84 on the spindle 38. The hub 78 is therefore rotationally fixed to the spindle 38 via the removable pin 82.

Figure 11:
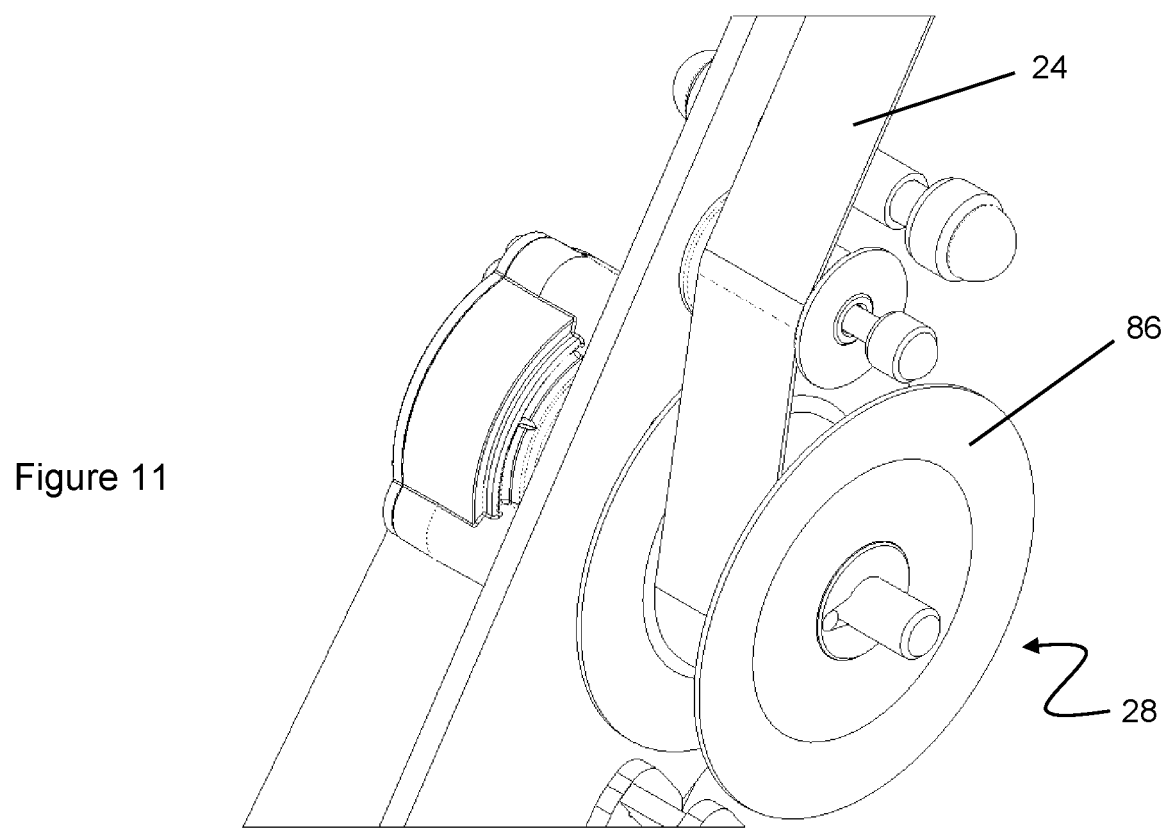
Figure 12:
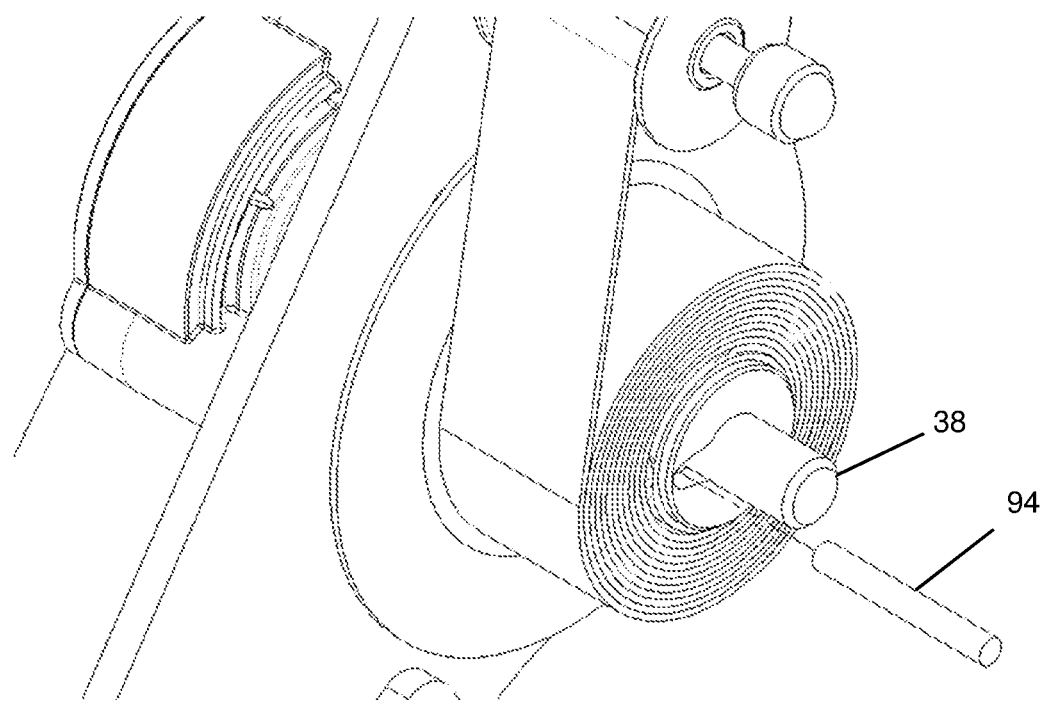
Figure 13:
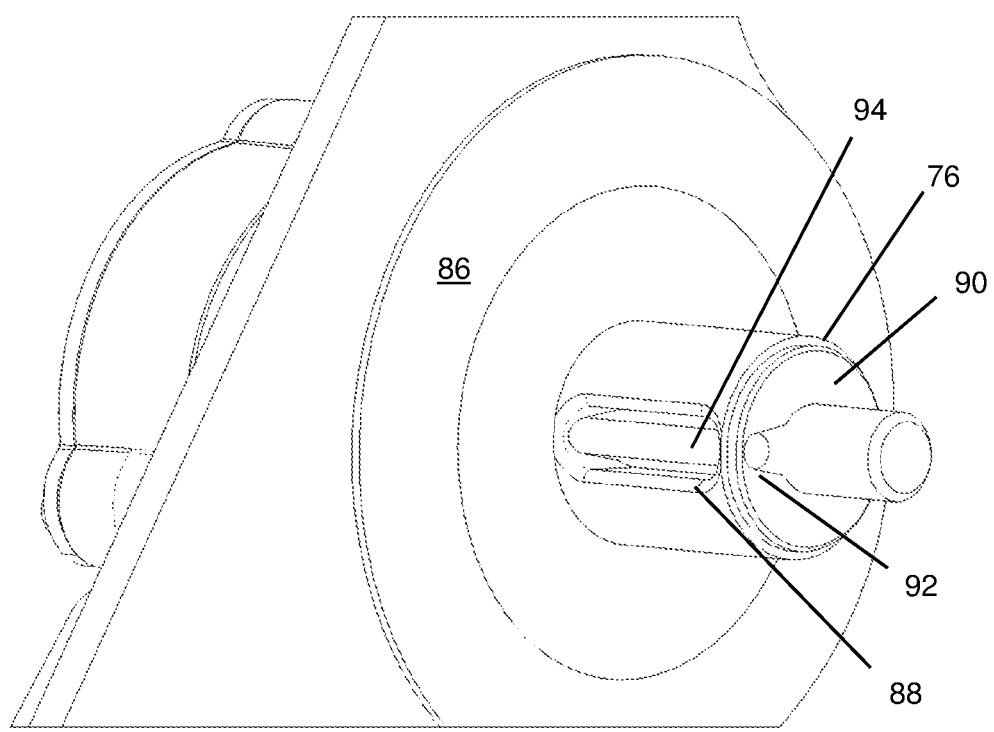
Figure 16:
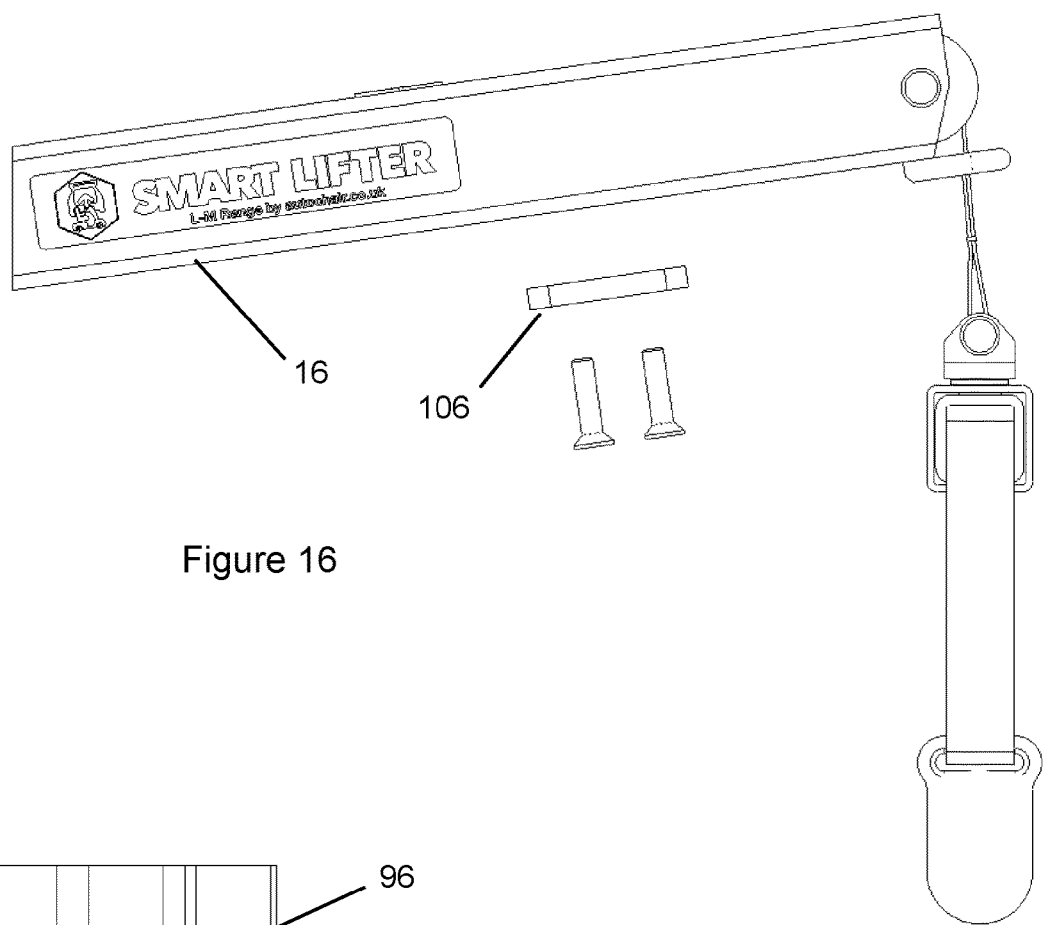

As shown in FIGS. 11-13, the hub 78 comprises a plurality of side walls 86 at either end thereof. The side walls 86 may be separated by a distance substantially the same as the width of the belt 24, therefore preventing lateral movement of the belt 24. The hub 78 and side walls 86 therefore provide a "bobbin" like arrangement. The side walls 86 may be removably attached to the hub 78 to allow insert/removal of the belt 24. The side walls 86 rotate with the hub 78/spindle 38. The side walls 86 therefore prevent wear of the edges of the belt 24. An end of the hub 78 may protrude outwardly from the surface of the side walls 86 (see FIG. 11). For example the end may protrude by between 1 mm and 5 mm.

The hub 78 comprises a connection assembly to allow removable connection of the belt 24 to the hub 78/spindle 28. The hub 78 comprises a recess 88 extending along the axial length thereof. The recess 88 is configured to accommodate the width of the belt 24. At least one end wall 90 of the hub 78 comprises an aperture 92 opening into the recess 88 (i.e. such the recess 88 at least partially extends into one or both of the end walls 90). An end of the belt 24 comprising a loop or the like is inserted into the recess 88. A pin 94 is then inserted along the length of the recess 88 via the aperture 92. The pin 88 is passed through the loop in the belt. The pin 94 is then retained in place by the aperture 92 and/or a groove in one or both of the end walls 90. The belt 24 is therefore secured to the hub 78.

To detach the belt 24 from the hub 78, the pin 94 is removed. The pin 94 is accessible from the outer side of the spool 28, so the belt 24 may be detached without removing the spool side walls 86.

The hub 78 is operatively positioned between the mounting brackets 32 on either side thereof. The fixed length of the hub 78 therefore maintains the spacing of the mounting brackets 32. This prevents the brackets 32 from engaging the spool 28 and generating additional load on the actuator 26. The hub 78 increases the tolerances between the spool 28 and brackets and therefore can accommodate twisting and/or bending of the joint between the arms. The hub 78 may be wider than the spool 28 to maintain a desired spacing of the brackets 32.

FIGS. 14-17 show the telescoping arrangements of the upper portion and the lower portion of the boom 4.

Figure 17:
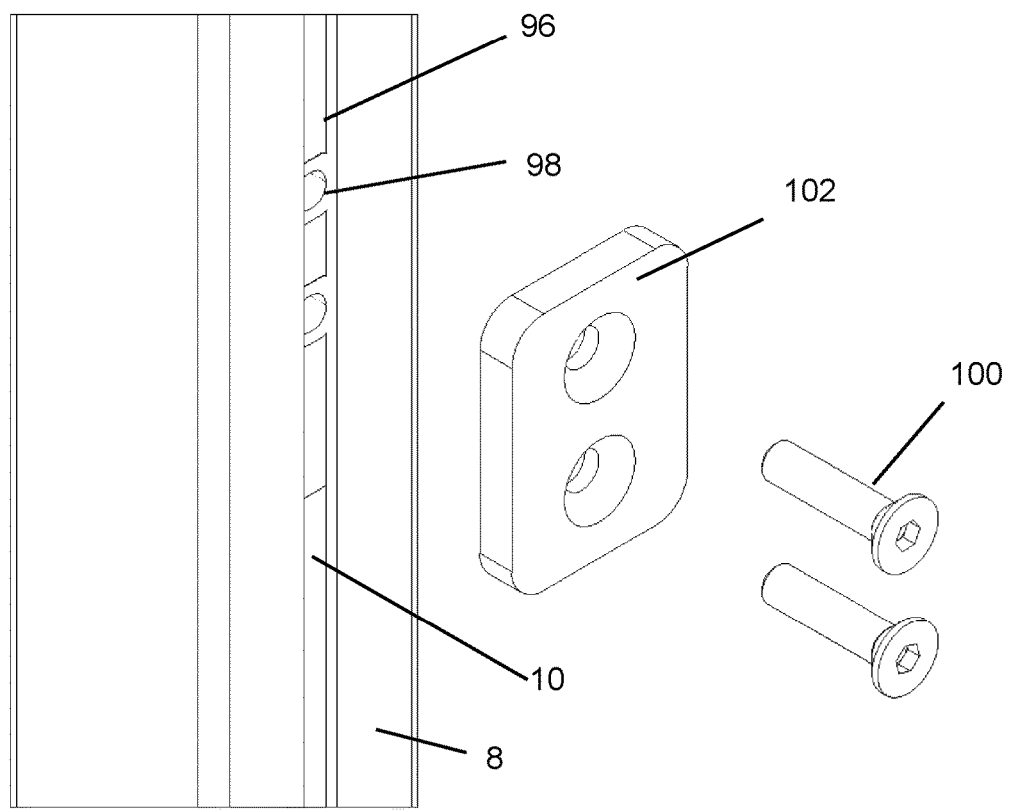

As shown in FIG. 15, the first boom member 8 comprises an axial slot 96 extending along the length thereof. The length of axial slot 96 defines the length of the extension/retraction of the mast. As best seen in FIG. 17, the second boom member 10 comprises a plurality of apertures 98 to receive a plurality of respective fasteners 100. The apertures 98 comprise rivet nuts. A clamping plate 102 is placed intermediate the fasteners and the first boom member 8. The fasteners pass from the clamping plate 102 to connect to the apertures 98. The clamping plate 102 therefore provides a clamp configured to grip the first boom member 8, preventing relative movement between the first boom member 8 and the second boom member 10. The clamping plate 102 increases the effective area of contact between the first and second boom members, reducing the likelihood of damage and/or marking of the boom members.

A similar arrangement is provided on the upper portion of the boom 4. Likewise an axial slot 104 is provided in the fifth boom member 16 and a clamping plate 106 clamps the fourth boom member 14 and the fifth boom member 16 in position.

Figure 18A:
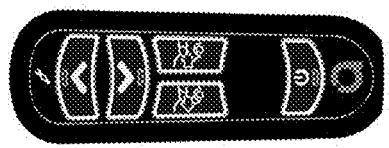
FIGS. 18a-c show a controller for controlling the hoist.
Figure 18B:
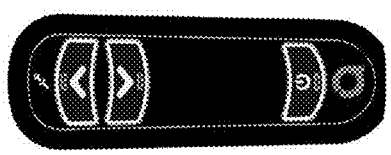
Figure 18C:
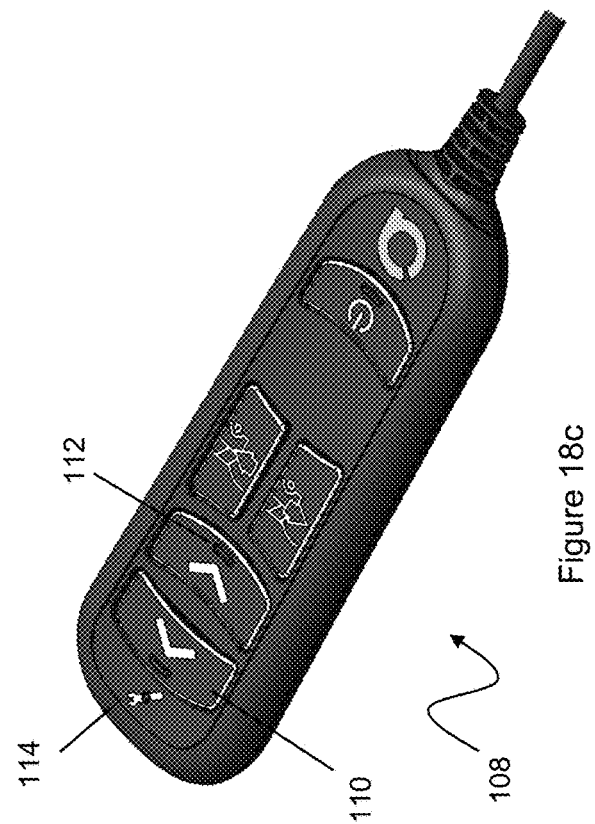

FIGS. 18a-c shows a controller 108 for controlling operation of the hoist 2. The controller 108 comprises a plurality of buttons 110 to allow selection of one or more operations. For example, a first button to lower the belt 24, a second button to raise the belt 24 and/or a power button etc. Additional buttons may be provided to rotate/swivel the boom for about the upright axis, e.g. where a suitable actuator is installed. In other examples, swiveling rotation is effected manually.

The buttons 110 are provided in a large and/or spaced format (i.e. there is a gap provided between the buttons), to allow easy operation for those with reduced dexterity. The buttons 110 are configured to illuminate when pressed (e.g. by an indicator 112 embedded therein, or provided behind/within the button). The controller 108 comprises a magnet and/or magnetic material configured to connect to a magnet/magnetic material on the hoist 2 and/or vehicle, thus allowing convenient stowing of the controller 108.

The controller 108 comprises an indicator 114 (e.g. an LED, buzzer/speaker or the like) to alert the user of one or more condition of the hoist 2, e.g. if it requires a service.

Requirement for a service may be determined by one or more factors: a fixed period of time (e.g. a service is required at fixed intervals regardless of usage); number of lifting/lowering cycles; period of time hoist is in actual operation (e.g. amount of time actuator is running); the number of times the hoist assembly is powered on and/or off; or other factors indicating the usage of the hoist 2.

Figure 19:
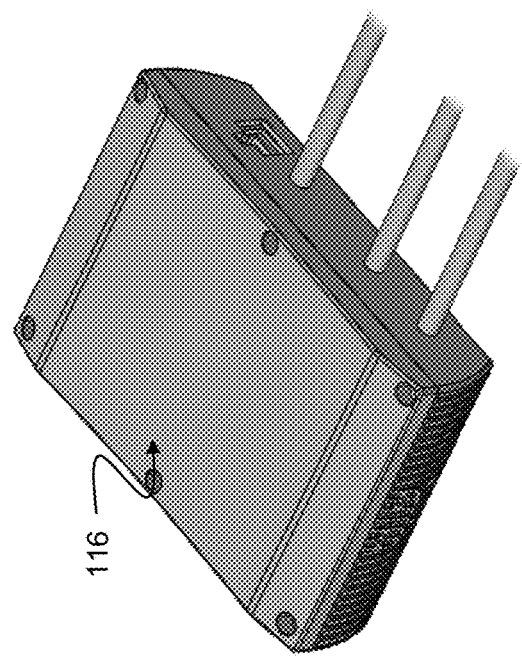
FIG. 19 shows a control box for controlling the hoist.
Figure 20:
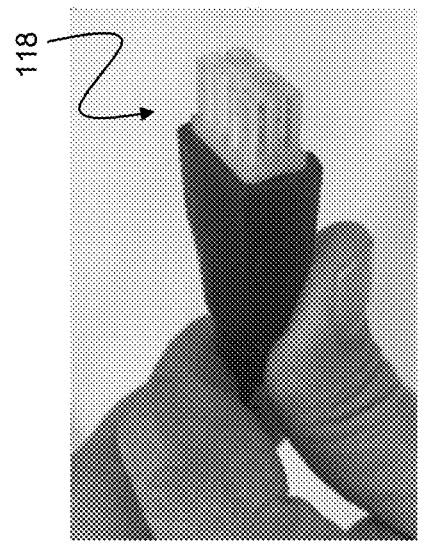
FIG. 20 shows a plug for the controller or control box.

The controller 108 is connected to control box 116 (see FIG. 19). The control box 116 is configured to receive instructions from the controller 108 and control the actuator 26 accordingly. The control box 116 is operatively connected to the vehicle power supply, to provide power to drive the actuator 26. The connections between the control box 116, controller 108 and/or actuator 26 may be disconnectable (e.g. via a plug/socket arrangement). As shown in FIG. 20, the plug 118 comprises a large form factor connection, for example, a Molex® connector. The plugs 118 are loosely held within the socket (e.g. via interference fit) and therefore can be inserted/removed with a push/pull action. The plug 118 can therefore easily be removed without the user needing to uncouple latches etc. In alternative embodiment, latches or the like may be used to secure the plug 118. The plugs/sockets may be color coded to ensure the correct plug is used with the respective socket.

The control box 116 comprises a computer (e.g. a programmable micro-controller/micro-processor) configured to determine when the service is required. The computer may have a clock and/or store date/time information, therefore allowing calculation of any service periods. Additionally or alternatively, the computer is configured to count the number of lifting cycles, power cycles (e.g. on/off button presses) and/or actuator 26 usage. On the event a service condition is met, then control box 116 illuminates the indicator 114.

The controller 108 and/or control box 116 are waterproof and/or comprise a waterproof casing.

The control box 116 is configured to detect when the actuator experiences a load above a predetermined threshold. For example, this may indicate the actuator 26 is overburdened (e.g. the scooter is too heavy) and/or when the belt is fully retracted. The control box 116 is configured to monitor the electrical characteristics of the actuator 26 or electrical supply thereto during operation thereof.

The control box 116 may monitor one or more of: the current drawn, the voltage, the impedance or the capacitance of the power supply to the actuator 26 or the actuator 26 itself. The sensed values and/or a rate of change in the sensed values may be monitored. If an abnormal electrical characteristic or behavior is detected (i.e. lies outside of a predetermined threshold or range or abnormal rate of change), operation of the actuator 26 may be ceased and/or the power to the actuator may be limited/reduced.

For example, if the current increases beyond a threshold (e.g. spikes), this may indicate the belt is fully retracted or the motor is being overloaded for some other reason. The power (i.e. current) to the actuator 26 is then cut-off. This allows control of the actuator 26 to be adapted accordingly to the load thereon. Additionally or alternatively, this prevents the actuator 26 continuing to the run when the belt is fully retracted, i.e. when an end member of the belt abuts the distal end of the boom, which may prevent motor burn out or blown fuses.

In the examples disclosed herein, electrical current is used as a proxy for the mechanical overloading of the motor, e.g. for identifying stall of a very small rotation of the rotor indicative of a condition in which the motor is struggling to generate sufficient torque to wind the webbing at a normal rate. In other examples, a torque sensor could be used or else a rotation speed sensor for the motor, gearbox and/or spool either instead of, or in addition to, current sensing.

Additionally or alternatively, the system may be configured to determine the extent of retraction of the belt 24. This may be performed in a number of ways:
measuring the number of revolutions of the actuator/spool;
measuring the time actuator is active (in concert with the speed setting of the actuator if applicable);
and/or providing one or more marking/indicator on the belt 24 and detecting the position of the marking/indicator.

The current and/or extent of retraction may be determined using a Hall effect and/or Reed sensor. The Hall effect/Reed sensor may determine the current supplied to actuator by measuring the magnetic field generated by the current passing through the power supply and/or actuator. Additionally or alternatively, the Hall effect/Reed sensor may be used to determine the position of one or more magnets in the actuator (i.e. in an electric motor). The Hall sensor may therefore be used to calculate the number of revolutions performed by counting the number of passes the one or more magnets make past the sensor.

In prior art devices, a large or high power actuator is used to accommodate a safety margin in the load that may be experienced by the motor to prevent burn-out of failure of the actuator. The load measuring system and/or the retraction system eliminate the need or reduce the size of the margin required, thereby allowing a smaller or low power actuator.

When the electric motor is not energized, a locking mechanism for the spool, gearbox and/or motor may be engaged to prevent payout of the belt, e.g. when a scooter is partially or fully suspended by the hoist. Additionally or alternatively it may be possible for the controller to retain the motor in an energized condition but without rotating the output shaft to thereby resist payout of the belt in an uncontrolled manner.

The computer of the control box 116 is programmable, e.g. to change thresholds or functionality. For example, limits may be set using the controller 108 or other input means. In some models, additional sensors may be used to determine the control functionality. For example, the length of payout of the belt may be sensed, e.g. by sensing rotation of the spool and/or roller. In other examples, the motor and/or computer may set a datum point when the belt is fully retracted, e.g. in a startup mode of operation, and may use the datum point or the rotation of the motor, gearbox and/or spool relative to the datum point as a further control measure.

In other examples, a sensor or electrical cut-out on the locking mechanism 20 could be used to prevent/allow operation of the motor when the locking mechanism is disengaged/engaged respectively.

The controller may monitor ongoing usage of the hoist and/or maintain a log of one or more usage parameter, e.g. in a non-volatile memory. The controller may increment the log according to and/or during an instance of use of the hoist/actuator. The controller may compare the log against one or more predetermined criterion in order to output an indication of the operational health of the hoist. The controller may be configured to indicate whether a service of the hoist is required according to one or more service condition determined by the controller. For example the controller may maintain a simple count of the number of instances of use of the hoist/actuator. Additionally/alternatively, the controller may maintain a log of duration of operation of the motor and/or loading (e.g. by way of current sensing). The controller may log the number and/or frequency of overloading events and may indicate if a degradation in performance is determined.

The present invention provides a low maintenance hoist with a reduced likelihood of damage to the lifting belt or other components. The rotating joints are self-lubricating, therefore mitigating the need to lubricants etc. The hoist is adjustable in a simple fashion that prevents damage or marking of the boom.

The motor may be placed on either side of the boom, thus allowing the device to be used in a plurality of different vehicles. The mounting bracket arrangement reduces the torque forces on the boom and/or spool, thereby reducing wear and damage to the motor. The use of dry bearings ensures the device is easy to assemble/disassemble (e.g. no oil mess) and requires no maintenance.

The hoist is easy and simple to use and control for people with reduced dexterity and is resistant to rain or other spills. The hoist comprises a self-limiting actuator, and the roller and spool are configured to be low friction and to reduce unnecessary loads on the actuator. The risk of burn out of the motor is prevented, increasing the safety of the hoist and reducing the likelihood of over-heating or fire etc. This allows the use of a smaller motor, thereby reducing the weight and increasing the compactness of the system. The hoist automatically informs the user when a service is due.

The hoist is collapsible therefore providing a more compact configuration and use in a wider range of vehicles. The mechanism to collapse the hoist is simple to use, for example, it can be actuated using only the large handle, without fiddly or complex movements (e.g. twisting) which may be difficult for some users.

What is claimed is:

1. A hoist mechanism for lifting articles into/from an interior of a vehicle, the hoist mechanism comprising:
    a boom arranged to be mounted on the vehicle;
    a length of webbing depending from the boom and configured to be attached to an article to be lifted in use; and
    an electric motor configured to retract the webbing to provide lifting of the article by winding the webbing onto a spool, wherein the boom comprises a first mounting bracket on a first side of the boom and a second mounting bracket mounted on a second, opposing side of the boom, wherein the spool is supported between the first and second mounting brackets, and the electric motor is selectively mountable to each of the first and second mounting brackets, respectively, such that the spool is mounted to one side of the first mounting bracket or the second mounting bracket and the electric motor is mounted on another side of the first mounting bracket or the second mounting bracket,
    wherein the electric motor is supported on the first mounting bracket or the second mounting bracket via a further bracket mounted to the first mounting bracket or the second mounting bracket opposing the electric motor, and
    the further bracket comprises an aperture therein configured to support one or both of the spool and a dry bearing configured to support the spool.

2. The hoist mechanism according to claim 1, further comprising:
    a controller configured to supply power to the electric motor for actuation thereof, the controller further configured to monitor one or more electrical parameter of an actuator or the power thereto, determine whether the one or more electrical parameter is within one or more predetermined threshold, and to selectively control the power supply to the actuator according to a determination.

3. The hoist mechanism according to claim 2, wherein the controller is configured to reduce or deny power to the actuator when the one or more monitored electrical parameter is outside of the one or more predetermined threshold.

4. The hoist mechanism according to claim 2, wherein the one or more electrical parameter comprises an operational variable indicative of power, rotation, torque or work done by the electric motor.

5. The hoist mechanism according to claim 2, wherein the controller is configured to maintain a log of one or more usage parameter in a non-volatile memory, the controller arranged to increment the log according to and/or during an instance of use of the actuator so as to monitor ongoing usage of the hoist mechanism and, wherein the controller compares the log against one or more predetermined criterion in order to output an indication of an operational health of the hoist mechanism.

6. The hoist mechanism according to claim 5, wherein the predetermined criterion comprises one or more of: a predetermined period of time; a number of lifting/lowering cycles of the hoist mechanism; a number of times the hoist mechanism is powered on/off; or a period of time the electric motor is in use.

7. The hoist mechanism according to claim 2, wherein the controller is configured to indicate whether a service of the hoist mechanism is required according to one or more service condition determined by the controller.

8. The hoist mechanism according to claim 1, wherein the boom comprises a first portion angled relative to a second portion, the first and second mounting brackets spanning the first portion and the second portion.

9. The hoist mechanism according to claim 8, where one or both of the first portion and the second portion are extensible in a length direction.

10. The hoist mechanism according to claim 9, where an extensible portion of one or both of the first portion and the second portion comprises overlapping arm portions, one of the overlapping arm portions comprising an elongate opening defining a slot and the extensible portion comprising a releasable clamp member extending though the slot and selectively engaging the overlapping arm portions to lock the length of the overlapping arm portions.

11. The hoist mechanism according to claim 1, wherein the boom comprises first and second pivotally connected arms, the first arm being arranged to be mounted in an upright orientation within the vehicle and the second arm moveable relative to the first arm between a raised position and a lowered position so as to vary an angle defined between a longitudinal axis of each arm, the hoist mechanism further comprising:

a releasable latching mechanism configured to retain the second arm in the raised position, the releasable latching mechanism comprising a lever rotatably mounted to one of the first arm and the second arm about a pivot point and having an engagement formation, the engagement formation being releasably engageable with an opposing engagement formation on the other of the first arm and the second arm in the raised position so as to prevent relative movement of the first and second arms, the lever being manually rotatable relative to one or both of the first and the second arm while in the raised position to disengage the opposing engagement formation to permit movement of the second arm relative to the first arm to the lowered position.

12. The hoist mechanism according to claim 11, further comprising a hub portion removably mounted to a rotatable spindle driven by the electric motor.

13. The hoist mechanism according to claim 12, wherein the hub portion comprises a recess configured to receive an end of the webbing and a retaining member configured to extend through at a least a portion of the recess to engage and secure the end of the webbing within the recess, the retaining member being removably engageable with the hub portion, such that the webbing is removably secured to the hub portion.

14. The hoist mechanism according to claim 13, wherein the retaining member comprises a pin or a screw configured to axially extend along the length of the hub portion and is held in position via an aperture in one or both ends of the hub portion.

15. The hoist mechanism according to claim 12, wherein the hub portion is configured to space the spool from the first and second mounting brackets.

16. The hoist mechanism according to claim 12, wherein the hub portion at least one or both of partially extends into and abuts the first and second mounting brackets.

17. The hoist mechanism according to claim 1, wherein the spool comprises a plurality of side walls configured to extend either side of the webbing in use and rotate in unison with the spool.

18. The hoist mechanism according to claim 17, wherein the side walls extend into a cut-out in the boom.

19. The hoist mechanism according to claim 1, further comprising:
one or more roller mounted to the boom via one or more standoff at a location spaced from the spool and configured to support the webbing, wherein the one or more roller comprises a plurality of side walls configured to extend either side of the webbing in use.

20. The hoist mechanism according to claim 19, wherein the one or more roller is mounted directly on the one or more standoff.

* * * * *